(12) United States Patent
Chen et al.

(10) Patent No.: US 10,172,130 B2
(45) Date of Patent: Jan. 1, 2019

(54) WIDEBAND LOW LATENCY COMMUNICATION

(71) Applicant: QUALCOMM Incorporated, San Diego, CA (US)

(72) Inventors: Wanshi Chen, San Diego, CA (US); Durga Prasad Malladi, San Diego, CA (US); Peter Gaal, San Diego, CA (US); Hao Xu, San Diego, CA (US); Shimman Arvind Patel, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 15/293,664

(22) Filed: Oct. 14, 2016

(65) Prior Publication Data

US 2017/0215186 A1 Jul. 27, 2017

Related U.S. Application Data

(60) Provisional application No. 62/286,189, filed on Jan. 22, 2016.

(51) Int. Cl.
*H04L 12/28* (2006.01)
*H04W 72/04* (2009.01)
(Continued)

(52) U.S. Cl.
CPC ......... *H04W 72/0446* (2013.01); *H04L 5/001* (2013.01); *H04L 5/003* (2013.01);
(Continued)

(58) Field of Classification Search
CPC ....................................................... H04L 12/50
(Continued)

(56) References Cited

U.S. PATENT DOCUMENTS

2013/0028225 A1* 1/2013 Ko .................. H04B 7/0486
370/329
2015/0180622 A1 6/2015 Yoo et al.

OTHER PUBLICATIONS

ISA/EP, International Search Report and Written Opinion of the International Searching Authority, Int'l Application No. PCT/US2016/065493, dated Apr. 13, 2017, European Patent Office, Rijswijk, NL, 20 pgs.

(Continued)

*Primary Examiner* — Dang T Ton
(74) *Attorney, Agent, or Firm* — Anthony R. Morris

(57) ABSTRACT

Methods, systems, and devices for wireless communication are described. A wireless device configured for carrier aggregation may communicate using transport blocks (TBs) mapped according to a wideband configuration that includes resources of multiple component carriers (CCs) within a single, low latency transmission time interval (TTI)—e.g., a TTI that has a shorter duration relative to other TTIs used in the same system. The number of CCs, and thus bandwidth, available for mapping each TB may change dynamically based on the configuration of the CCs. For a CC configured with a control region during a given low latency TTI, a TB sent during that low latency TTI may not be mapped to resources of that CC. In other cases, portions of a CC configured with a control region may be used for wideband configurations. Wideband low latency communications may be used on the uplink or downlink communications, or both.

29 Claims, 15 Drawing Sheets

(51) Int. Cl.
  *H04L 5/00* (2006.01)
  *H04L 27/26* (2006.01)
(52) U.S. Cl.
  CPC ............ *H04L 5/006* (2013.01); *H04L 5/0044* (2013.01); *H04L 5/0048* (2013.01); *H04L 5/0053* (2013.01); *H04L 5/0064* (2013.01); *H04L 27/2602* (2013.01); *H04L 27/2608* (2013.01); *H04W 72/042* (2013.01); *H04W 72/0453* (2013.01)
(58) Field of Classification Search
  USPC ........................................................ 370/329
  See application file for complete search history.

(56) References Cited

OTHER PUBLICATIONS

Nokia Networks, "On Shorter TTI for Latency Reduction," 3GPP TSG-RAN WG1 Meeting #83, R1-157292, Anaheim, USA, Nov. 15-22, 2015, 4 pgs., XP051040076, 3rd Generation Partnership Project, Mobile Competence Centre, 650, Route Des Lucioles, F-06921, Sophia-Antipolis Cedex, France.

ISA/EPO, Partial International Search Report of the International Searching Authority, Int'l App. No. PCT/US2016/065493, dated Feb. 23, 2017, European Patent Office, Rijswijk, NL, 9 pgs.

Levanen et al., "Low Latency Radio Interface for 5G Flexible TDD Local Area Communications," 2014 IEEE International Conference on Communications Workshops (ICC), Jun. 10, 2014, pp. 7-13, XP032630785, DOI: 10.1109/ICCW.2014.6881164, Institute of Electrical and Electronics Engineers. [retrieved on Aug. 20, 2014].

* cited by examiner

WIDEBAND LOW LATENCY COMMUNICATION

CROSS REFERENCES

The present application for patent claims priority to U.S. Provisional Patent Application No. 62/286,189, by Chen, et al., entitled "WIDEBAND LOW LATENCY COMMUNICATION," filed Jan. 22, 2016, assigned to the assignee hereof, and which is hereby expressly incorporated by reference herein in its entirety.

BACKGROUND

The following relates generally to wireless communication and more specifically to wideband low latency communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless device may be configured for low latency communications. That is, the device may communicate using a transmission time interval (TTI) that is shorter in duration relative to other TTIs in the system, which may reduce the time between transmissions. But because of the reduced duration TTI, low latency communication may result in greater overhead or reduced throughput over the wireless interface than communication using longer duration TTIs.

SUMMARY

A wireless device may use resources of multiple component carriers (CCs) of a carrier aggregation configuration to communicate during a short duration transmission time interval (TTI), which may decrease overhead and increase throughput as compared to relying on resources of a single CC. The wireless device may, for example, communicate using transport blocks (TBs) mapped according to a wideband configuration that includes resources of multiple CCs within a single, low latency TTI—e.g., a TTI that has a shorter duration relative to other TTIs used in the same system.

The number of CCs, and thus bandwidth, available for mapping each TB may change dynamically based on the configuration of the CCs. For example, for a CC configured with a control region during a given low latency TTI, a TB sent during that low latency TTI may not be mapped to resources of that CC. In other cases, portions of a CC configured with a control region may be used for wideband configurations. Wideband low latency communications may be used on the uplink or downlink communications, or both.

A method of wireless communication using a carrier aggregation (CA) configuration having a first CC and a second CC is described. The method may include identifying a first transmission time interval TTI and a second TTI. The second TTI may have a longer duration than the first TTI. The method may also include mapping a TB within the first TTI according to a wideband configuration that includes resources of the first CC and resources of the second CC, and it may include using the TB to communicate during the first TTI on the resources of the first CC and the resources of the second CC.

An apparatus for wireless communication using a CA configuration having a first CC and a second CC is described. The apparatus may include means for identifying a first TTI and a second TTI. The second TTI may have a longer duration than the first TTI. The apparatus may also include means for mapping a TB within the first TTI according to a wideband configuration that includes resources of the first CC and resources of the second CC, and it may include means for using the TB to communicate during the first TTI on the resources of the first CC and the resources of the second CC.

A further apparatus is described. The apparatus may include a processor, memory in electronic communication with the processor, and instructions stored in the memory. The instructions may be operable, when executed by the processor, to cause the apparatus to identify a first TTI and a second TTI. The second TTI may have a longer duration than the first TTI. The instructions may also be operable to cause the apparatus to map a TB within the first TTI according to a wideband configuration that comprises resources of the first CC and resources of the second CC and use the TB to communicate during the first TTI on the resources of the first CC and the resources of the second CC.

A non-transitory computer readable medium for wireless communication using a CA configuration having a first CC and a second CC is described. The non-transitory computer-readable medium may include instructions executable to identify a first TTI and a second TTI. The second TTI may have a longer duration than the first TTI. The instructions may be executable to map a TB within the first TTI according to a wideband configuration that comprises resources of the first CC and resources of the second CC and use the TB to communicate during the first TTI on the resources of the first CC and the resources of the second CC.

Some examples of the method, apparatus, or non-transitory computer-readable medium described above may further include processes, features, means, or instructions for identifying a control channel transmission that assigns the resources of the first CC and the resources of the second CC.

Some examples of the method, apparatus, or non-transitory computer-readable medium described above may further include processes, features, means, or instructions for using the TB to communicate comprises at least one of transmitting the TB or receiving the TB.

Some examples of the method, apparatus, or non-transitory computer-readable medium described above may further include processes, features, means, or instructions for using a second TB to communicate in a different direction than the TB using a non-wideband configuration that comprises other resources of the first CC or other resources of the second CC.

In some examples of the method, apparatus, or non-transitory computer-readable medium described above, the TB is an uplink (UL) TB or a downlink (DL) TB.

Some examples of the method, apparatus, or non-transitory computer-readable medium described above may further include processes, features, means, or instructions for identifying a third TTI that as a shorter duration than the second TTI. Some examples of the method, apparatus, or non-transitory computer-readable medium described above may further include processes, features, means, or instructions for mapping the second TB within the third TTI according to a non-wideband configuration that comprises resources of the first CC and excludes resources of the second CC. Some examples of the method, apparatus, or non-transitory computer-readable medium described above may further include processes, features, means, or instructions for using the second TB to communicate during the third TTI on the resources of the first CC.

Some examples of the method, apparatus, or non-transitory computer-readable medium described above may further include processes, features, means, or instructions for determining that the second CC comprises at least one of a control region, a multicast-broadcast single frequency network (MBSFN) region, a guard period, an UL subframe, or a cell-specific reference signal (CRS), or any combination thereof, during the third TTI, where mapping the second TB is based on the determination.

In some examples of the method, apparatus, or non-transitory computer-readable medium described above, the first CC and the second CC use different resource allocation methods or different modulation orders, or both.

In some examples of the method, apparatus, or non-transitory computer-readable medium described above, the resources of the first CC or the resources of the second CC, or both, comprise guard band resources.

Some examples of the method, apparatus, or non-transitory computer-readable medium described above may further include processes, features, means, or instructions for performing a first channel estimation for the first CC and a second channel estimation for the second CC, where the TB is communicated based on the first channel estimation and the second channel estimation.

In some examples of the method, apparatus, or non-transitory computer-readable medium described above, the first CC has a first cell-specific reference signals (CRS) port configuration and the second CC has a second CRS port configuration, and where the first channel estimation is based on the first CRS port configuration and the second channel estimation is based on the second CRS port configuration.

In some examples of the method, apparatus, or non-transitory computer-readable medium described above, the first CC and the second CC comprise a same number of demodulation reference signal (DMRS) ports.

In some examples of the method, apparatus, or non-transitory computer-readable medium described above, the first TTI and the second TTI comprise different precoding resource block (RB) group (PRG) configurations.

Some examples of the method, apparatus, or non-transitory computer-readable medium described above may further include processes, features, means, or instructions for performing a first rate matching procedure for the first CC and a second rate matching procedure for the second CC, where the TB is communicated based on the first rate matching procedure and the second rate matching procedure.

In some examples of the method, apparatus, or non-transitory computer-readable medium described above, a resource allocation scheme for the TB is based on a number of component carriers (CCs) used for mapping the TB.

In some examples of the method, apparatus, or non-transitory computer-readable medium described above, the resource allocation scheme comprises a frequency diversity scheme or a frequency selectivity scheme.

In some examples of the method, apparatus, or non-transitory computer-readable medium described above, a RB indexing configuration is based on a bandwidth of the first CC and the second CC.

In some examples of the method, apparatus, or non-transitory computer-readable medium described above, the first TTI comprises two or more symbols, and where the mapping for the TB comprises a frequency-first mapping scheme.

In some examples of the method, apparatus, or non-transitory computer-readable medium described above, a code block scheme for the TB is based on combined resources from the first CC and the second CC.

In some examples of the method, apparatus, or non-transitory computer-readable medium described above, a first portion of the TB is mapped to the resources of the first CC using a first code block scheme and a second portion of the TB is mapped to the resources of the second CC using a second code block scheme.

In some examples of the method, apparatus, or non-transitory computer-readable medium described above, a first modulation and coding scheme (MCS) is used for the first CC and a second MCS is used for the second CC.

Some examples of the method, apparatus, or non-transitory computer-readable medium described above may further include processes, features, means, or instructions for identifying a same channel state information (CSI) report for the first CC and the second CC.

In some examples of the method, apparatus, or non-transitory computer-readable medium described above, the first CC has a first CSI reference signal (CSI-RS) port configuration and the second CC has a second CSI-RS configuration.

In some examples of the method, apparatus, or non-transitory computer-readable medium described above, a quasi-co-location indication is configured for the first CC and the second CC.

In some examples of the method, apparatus, or non-transitory computer-readable medium described above, the resources of the first CC comprise a first uplink shared channel (UL-SCH) cluster and the resources of the second CC comprise a second UL-SCH cluster.

Some examples of the method, apparatus, or non-transitory computer-readable medium described above may further include processes, features, means, or instructions for performing a joint discrete Fourier transform (DFT) operation on the TB over the first CC and the second CC.

Some examples of the method, apparatus, or non-transitory computer-readable medium described above may further include processes, features, means, or instructions for communicating using a sounding reference signal (SRS) in a guard band of the first CC or the second CC, or both.

DETAILED DESCRIPTION

A wireless network may support wideband low latency communications where individual transport blocks (TBs) are mapped to multiple component carriers (CCs) of a carrier aggregation configuration. Wideband low latency communications may be used for both downlink (DL) and uplink (UL). Additionally, efficiency may be further increased by utilizing resource blocks (RBs) that would otherwise be reserved for guard bands within one or more CCs of the carrier aggregation configuration. In some cases, a single control may be associated with the wideband low latency operation. That is, a single control channel may assign resources for each CC in the wideband configuration.

In some cases, the set of CCs used for wideband low latency communications may be symbol-dependent, and so may be based on different configurations of the different CCs. For example, a CC configured with a control region (e.g., a special subframe guard period, an uplink subframe, or a multicast-broadcast single frequency network (MB-SFN)), may not be used for wideband communications. In other cases, available portions of these CCs may be used. In some cases, each CC may be configured separately—e.g., each CC may use separate modulation and coding schemes (MCS), resource allocation granularity, channel estimation, code block management, or the like. In other cases, the CCs used with the wideband low latency configurations may have one or more of these configurations in common.

Aspects of the disclosure introduced above are further described below in the context of a wireless communication system. Examples are then provided of various CC configurations and guard band utilization configurations that support wideband low latency communication. Aspects of the disclosure are further illustrated by and described with reference to apparatus diagrams, system diagrams, and flowcharts that relate to wideband low latency communication.

Figure 1:
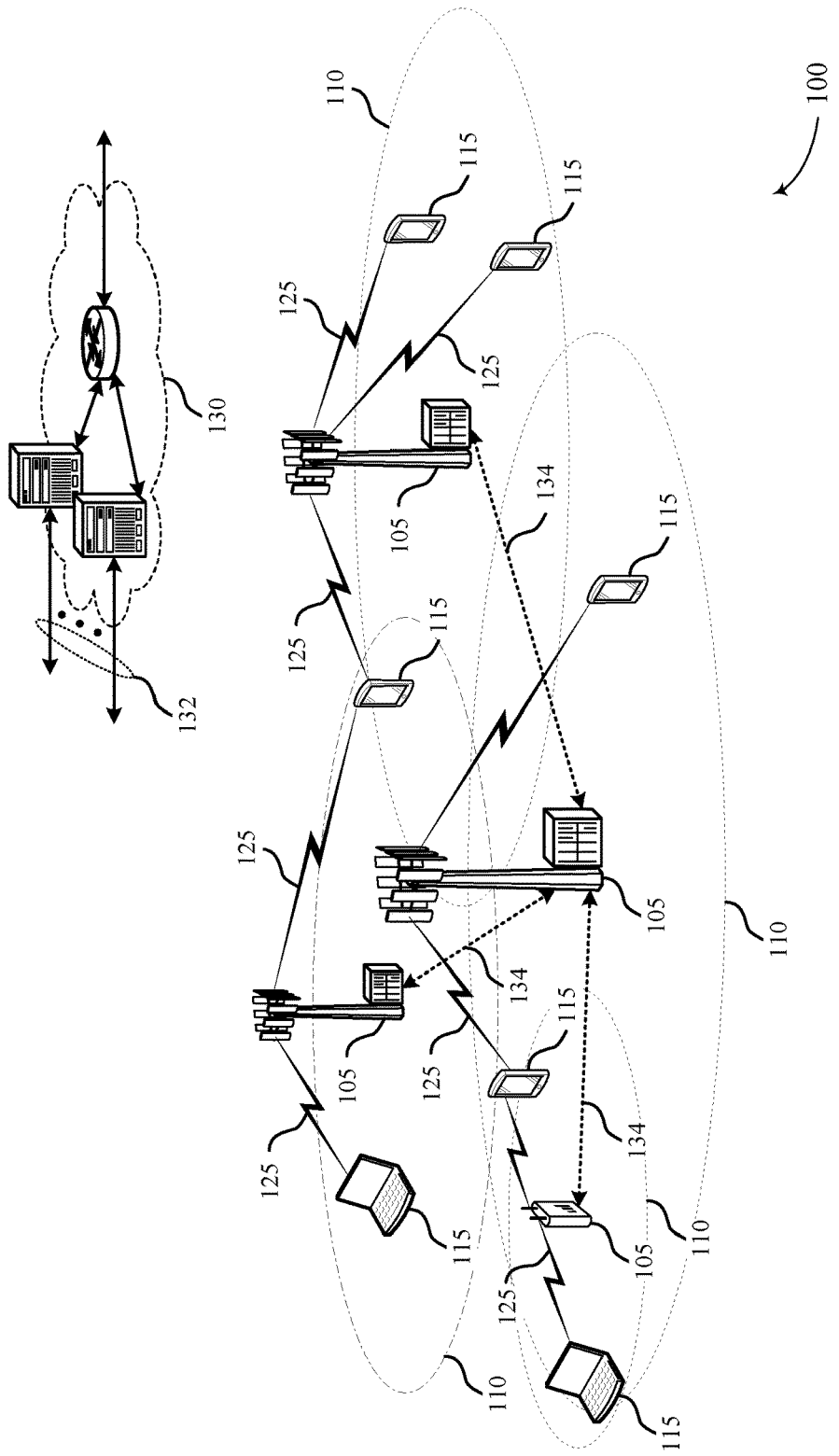
FIG. 1 illustrates an example of a wireless communications system that supports wideband low latency communication in accordance with aspects of the present disclosure.

FIG. 1 illustrates an example of a wireless communications system 100 that supports wideband low latency communication in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support wideband low latency communications between UEs 115 and base stations 105.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc. Base stations 105 and UEs 115 may be configured for wideband low latency communication and may thus be configured to use TBs mapped to resources of multiple CCs within a TTI, including a short-duration TTI.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Time intervals in wireless communications system 100 may include frames, subframes, and symbol periods, which may be expressed in multiples of a basic time unit (e.g., the sampling period, $T_s=1/30,720,000$ seconds). A frame may be a period of 10 ms ($T_f=307200$ Ts), which may be identified by a system frame number (SFN) ranging from 0 to 1023. Each frame may include ten 1 ms subframes numbered from 0 to 9. A subframe may be further divided into two 0.5 ms slots, each of which may contain 6 or 7 modulation symbol periods (depending on the length of the cyclic prefix (CP) prepended to each symbol). Excluding the CP, each symbol contains 2048 sample periods. In some cases the subframe may be the smallest scheduling unit, also known as a TTI. In other cases, a TTI may be shorter than a subframe or may be dynamically selected. In some cases, wireless communications system 100 may also utilize a reduced symbol period.

For low latency communication, for example, a TTI having a shorter duration than a subframe may be used. A short-duration or "low latency" TTI may be understood or defined relative to a longer duration or "non-low latency" TTI within wireless communications system 100. As discussed, wireless communications system 100 may support TTIs that have a 1 ms duration and include 12 or 14 symbol periods (e.g., an LTE subframe). A low latency TTI within wireless communications system 100 may, for example, have a duration of one symbol period, two symbol periods, or one slot.

Each TTI, including a low latency TTI, may be used to communicate a single transport block (TB) to one or more UEs 115. A TB may be a media access control (MAC) layer protocol data unit (PDU) whose size depends on factors such as the coding rate, the modulation scheme, and the number of resource blocks available. A TB may be divided into multiple code blocks. Each code block may include a number of cyclic redundancy check (CRC) bits to facilitate error detection and correction.

Wireless communications system 100 may utilize orthogonal frequency division multiple access (OFDMA) on the DL and, in some cases, single carrier frequency division multiple access (SC-FDMA) on the UL. In some cases, SC-FDMA may not be used for UL communications (e.g., when low latency UL communications are used). Both OFDMA and SC-FDMA configurations may partition the system bandwidth into multiple orthogonal subcarriers, which are also commonly referred to as tones or bins. Each subcarrier may be modulated with data. The spacing between adjacent subcarriers may be fixed, and the total number of subcarriers may be dependent on the system bandwidth. For example, the number of tones may be 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. In some cases, the subcarrier spacing may be increased. For example, low latency communications may utilize a reduced symbol period, and the subcarrier spacing may be the inverse of the symbol period.

UEs 115 and base stations 105 may communicate using one or more carriers. Communications using multiple CCs may be referred to as a carrier aggregation (CA) configuration. A UE 115 may thus be configured for communication on one CC or several CCs. Each CC in a CA configuration may include a designated control region which may schedule resources of that CC or other CCs in various examples. CA may thus differ from other types of spectrum allocation in that each CC of the CA configuration may be independently configured for standalone use.

Carriers (i.e., CCs) may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period.

In some cases, TDD subframes may include one or more special subframes, and the period between special subframes may determine the TDD DL-to-UL switch-point periodicity for the frame. Use of TDD may thus offer flexible deployment without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping geographic coverage areas 110 according to different TDD UL-DL configurations, a UE 115 attempting to receive and decode a DL transmission from a serving base station 105 can experience interference from UL transmissions from other, proximately located UEs 115. So some carriers may include subframes segmented into UL and DL symbol periods separated by a guard period.

Some base stations 105 may utilize a portion of the available DL bandwidth to broadcast multimedia data to some or all UEs 115 within the geographic coverage area 110. For example, a wireless communication system may be configured to broadcast mobile TV content, or to multicast live event coverage to UEs 115 located near a live event such as a concert or sporting event. In some cases, this may enable more efficient utilization of the bandwidth. These base stations may be referred to as multimedia broadcast multicast service (MBMS) or evolved multimedia broadcast multicast service (eMBMS) cells. In some cases, MBMS cells may be grouped together in an MBMS single frequency network (MBSFN) and the broadcast media may be transmitted on the same frequency resources by each supporting cell. UEs 115 in the coverage area may elect to receive the MBMS data, or not, depending on capability, user preference, or the like.

A base station 105 may insert periodic pilot symbols, such as a cell-specific reference signal (CRS), which may also be referred to as a common reference signal, to aid UEs 115 in channel estimation and coherent demodulation. CRS may include one of 504 different cell identities, for example. They may be modulated using quadrature phase shift keying (QPSK) and power boosted (e.g., transmitted at 6 dB higher than the surrounding data elements) to make them resilient to noise and interference. CRS may be embedded in 4 to 16 resource element (REs) in each RB based on the number of antenna ports or layers (up to 4) of the receiving UEs 115.

In addition to CRS, which may be utilized by all or many UEs 115 in the geographic coverage area 110 of the base station 105, while a demodulation reference signal (DMRS), which may also be referred to as a UE-specific reference signal (UE-RS), may be directed toward specific UEs 115 and may be transmitted on RBs assigned to those UEs 115. DMRS may include signals on 6 REs in each RB in which they are transmitted. The DMRS for different antenna ports may each utilize the same 6 REs, and may be distinguished using different orthogonal cover codes (e.g., masking each signal with a different combination of 1 or −1 in different REs). In some cases, two sets of DMRS may be transmitted in adjoining REs. In some cases, additional reference signals known as channel state information (CSI) reference signals (CSI-RS) may be included to aid in generating CSI. On the UL, a UE 115 may transmit a combination of periodic SRS and UL DMRS for link adaptation and demodulation, respectively.

In some examples, wireless communications system 100 may use an enhanced component carrier (eCC). An eCC may be characterized by one or more features including: flexible bandwidth, different TTIs, and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include segments that may be utilized by UEs 115 that are not capable of monitoring the whole bandwidth or prefer to use a limited bandwidth (e.g., to conserve power). In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot.

In conjunction with the reduced TTI length, an eCC may utilize dynamic TDD operation (i.e., it may switch from DL to UL operation for short bursts according to dynamic conditions.) Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other examples of control channel modifications include the use of additional control channels (e.g., for eMBMS scheduling, or to indicate the length of variable length UL and DL bursts), or control channels transmitted at different intervals. An eCC may also include modified or additional hybrid automatic repeat request (HARM) related control information.

In some cases (e.g., in a contention based wireless system) larger bandwidths may be used for higher data capacity and faster speeds. With larger bandwidth, processing stages such as fast-Fourier transform (FFT) sizes may also be scalable. That is, FFT size may vary based on the bandwidth. For example, a 1.4 MHz bandwidth signal may use a FFT size of 128, and a 20 MHz bandwidth signal may use a FFT size of 2048. In some cases, available bandwidth may be made larger than 20 MHz through CA or dual connectivity (i.e., communication using multiple cells with a non-ideal backhaul connection), allowing for faster data transfer rates. This may be the case even if each CC has a 20 MHz bandwidth.

In some cases, there may be a separate FFT for each CC. Such a scheme may be deployed for 1-ms and sub 1-ms low latency scenarios. As discussed above, bandwidth may be larger than 20 MHz. For example, if the bandwidth is 80 MHz, the FFT size may be as large as 8,192. Other parameters, such as a tone spacing of 15 kHz, CP length, etc., may still be maintained.

In some examples, there may be a fixed number of available RBs for each carrier. For instance, a system with a 20 MHz bandwidth may use 18 MHz (or 100 RBs) for communication because guard bands may be used at the carrier edges. This may be the case even though a UE 115 may support up to or nearly 20 MHz operation—e.g., 19.8 MHz (or 110 RBs) in some schemes. So using a guard band that effectively decreases available carrier bandwidth to 18 MHz may be characterized as a 10% overhead for carrier operation. Reducing guard band size or use may thus enable additional bandwidth for a carrier.

As discussed above, UEs 115 may be configured for low latency communication, which may employ TTIs with a duration of less than 1-ms. The number of resource elements available for low latency communication may be dependent on the bandwidth and proportion of REs utilized for CRS in some cases. For example, for a symbol that includes CRS, each 20 MHz may have approximately 1200 REs per symbol, and up to ⅓ of the REs may be used for CRS. In such a case, there may be, for example, 800 REs available for other communications. Assuming 50 REs for control signaling, and a range of ⅙ to ⅔ coding rate (e.g., using QPSK modulation), a number of resources available for communication within the CRS symbol may be equivalent to about 250 bits to 1000 bits. Such limitations may be more pronounced for carriers with narrower bandwidths. For example, with a system bandwidth of 5 MHz, the number of bits that can be transmitted may vary from 50 to 200 bits.

Such limitations may be inefficient for large packets. Packet segmentation may be employed, but may still result in relatively efficient operation. By contrast, mapping a transport block (TB) over multiple CCs may provide a more efficient way to transmit larger packets. For example, if 4 CCs are used to transmit a single TB for a 20 MHz bandwidth, the number of bits that 4 CCs can convey ranges from 1050 to 4200 bits. This is about a 420-percent improvement over the single CC case, or about a 5-percent improvement if 4 separate TBs are transmitted on each CC (with up to 250 to 1000 bits on each CC, as mentioned above), even when per-CC packet segmentation overhead is not considered, which may be in the range of several bytes per CC. In another example, for a 5 MHz bandwidth, the number of bits that 4 CCs can convey ranges from 250 to 1000 bits—a 500-percent improvement over the single CC case, or about a 25-percent improvement if 4 separate TBs are transmitted on each CC (with up to 250 to 1000 bits on each CC), even when per-CC packet segmentation overhead is not considered. Efficiencies may be further improved by leveraging resources otherwise designated for guard bands.

Accordingly, a UE 115 or base station 105 configured for CA may communicate using TBs mapped to more than one component carrier during a low latency TTI. The bandwidth used for each TB may be dynamic and based on the configuration of the CCs and/or the operating condition in each TTI. Wideband low latency communications may be used for UL or DL communications, or both, as described further below.

Figure 2:
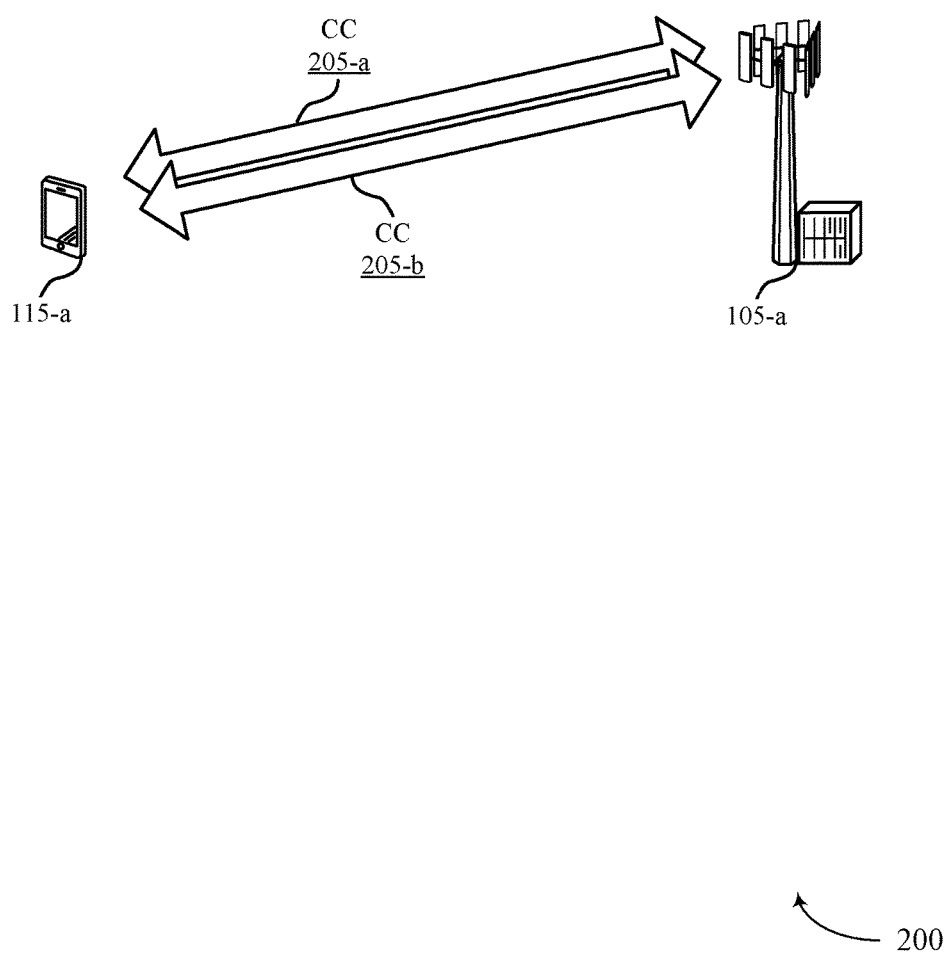
FIG. 2 illustrates an example of a wireless communications system that supports wideband low latency communication in accordance with aspects of the present disclosure.

FIG. 2 illustrates an example of a wireless communications system 200 for wideband low latency communication. Wireless communications system 200 may include base station 105-a and UE 115-a, which may be examples of the corresponding devices described with reference to FIG. 1. Wireless communications system 200 may, for example, allow for increased communication efficiency using individual TBs mapped to multiple CCs.

In wireless communications system 200, a TB may be mapped to multiple CCs (e.g., CC 205-a and CC 205-b) in a wideband configuration for either UL or DL communications, or both, between base station 105-a and UE 115-a. In some cases, whether CC 205-a and CC 205-b may be used for wideband communications may be symbol-dependent (or TTI-dependent when a TTI includes one or more symbols), due to different control regions on different CCs. That is, in some cases, some symbols of CC 205-a or CC 205-b may be used for wideband communications, even though other symbols are unavailable for wideband use.

Variations and differences between CCs 205-a and 205-b may be accounted for when a TB is mapped to resources of both CCs 205 within a TTI. Effects of wideband operation may also be accounted for to support narrowband operation, maintain compatibility with legacy devices in the system, and promote efficient use of resources. Several approaches and features for accounting for such variations between CCs 205 and effects of wideband operation are described in turn below.

For example, CCs 205 may use different resource allocation methods (e.g., RB-based, CCE-based, etc.) or modulation orders (e.g., QPSK, 16-QAM, 64-QAM, etc.). In some cases, the number of CRS ports may be different for different CCs. Likewise, variations or differences between symbols or physical channels may be accounted for. For example, for a CRS-based low latency physical downlink shared channel (uPDSCH), channel estimation may be performed on a per-CC basis, based on a configuration, or hardcoded in a specification.

In some examples, a common control channel may assign resources of both CCs 205. For instance, a low latency control channel of CC 205-a may assign resources of both CC 205-a and CC 205-b within a low latency TTI.

In some cases, an uPDSCH transmission may use different transmission schemes on different CCs with minimal impact. For example, if CCs 205 use different CRS port configurations (e.g., 2-port for CC 205-a and 4-port for CC 205-b), a uPDSCH with a portion of resources in CC 205-a may employ space frequency block coding (SFBC), while a uPDSCH with a portion of resources in CC 205-b may have a combination of frequency switched transmit diversity (FSTD) and SFBC. Additionally or alternatively, the same transmission scheme may be employed across different CCs. For example, the uPDSCH transmission may be based on the minimum CRS port configuration of the CCs 205.

In some cases, the same number of DMRS ports may be used across different CCs for DMRS-based wideband communication. For instance, a precoding RB group (PRG) for a low latency data channel (e.g., uPDSCH) may be defined differently from that of a non-low latency data channel (e.g., PDSCH). A PRG may, for example, have RBs in different CCs for RBs located in guard bands. In another example, different CCs may have a different number of DMRS ports or densities.

A resource allocation scheme for wideband low latency communications may depend on the number of CCs used in a CA configuration. In some instances, multiple resource allocation schemes (e.g., frequency diversity or frequency selectivity) may be employed. For example, if a low latency data channel is transmitted using a single CC 205 transmission, a first resource allocation granularity or a first number of bits may be used for resource allocation. In another example, a low latency data channel transmission may span CCs 205-a and 205-b so a different resource allocation granularity or a second number of bits may be used for resource allocation. Additionally, in some instances, a single bit may be used to indicate whether a CC 205 is scheduled as a resource allocation for a CC (e.g., a secondary CC).

RB indexing may be done across CCs 205 to support wideband low latency communication (e.g., to support a wideband low latency data channel). For example, the RB indexing for CC 205-a may be 0-109 and RB indexing for CC 205-b may be 110-219. In some cases, the RB indexing may be UE specific (e.g., a first UE 115 may have index 0 starting from CC 205-a, while a second UE 115 may have index 0 starting from CC 205-b).

A discussed above, a low latency TTI may include one or two symbols in different examples. In some cases, a low latency TTI may have two or more symbols. In such cases, the resource mapping for a TB may be performed in a frequency-first, time-second manner. For example, the frequency-first mapping may be done by mapping modulation symbols in a symbol from the lowest frequency in the lowest cell index first, to the highest frequency in the lowest cell index, to the lowest frequency in the second lowest cell index, and so on.

In some cases, for a TB spanning multiple CCs, code block (CB) management may be similar to a single CC case. For example, if the number of bits in the TB is under 6144, a single CB may be used. But in some examples, two or more CBs with a maximum of 6144 bits may be used. In some cases, a CB may be limited such that it does not span two or more CCs, even if the CB has a size less than 6144 bits.

In some cases, the transmission of wideband channel state information (CSI) may be supported. As an example, a coordinated CSI-RS configuration across CCs 205 may be employed for a CSI bandwidth over 20 MHz. But in some cases, a codebook subset restriction may be per CC 205. In some cases, both wideband CSI and individual CC-CSI may be supported.

Wideband low latency may enable different MBSFN configurations to be deployed across CCs 205. For example, for a particular subframe of CC 205-a and CC 205-b, CC 205-a may be configured as an MBSFN subframe, while CC 205-b may not be. In some cases, CRS may be partially enabled in the MBSFN subframe of the CC 205-a. For example, CRS may be enabled in the allocated low latency RBs or in the same CRS symbols as in a subframe. In other cases, CRS-based low latency communication may be supported by using CRS in different subframes.

In some examples, quasi-co-location (QCL) may be configured across two or more CCs for improved frequency or time tracking, channel estimation, and the like. For instance, a common QCL may be used for both CCs 205. This may be beneficial in coordinated multi point (CoMP) scenarios in which wideband low latency operations may be used. UE 115-a may receive dedicated signaling (e.g., a radio resource control (RRC) configuration message) that indicates whether QCL is configured across CCs 205-a and 205-b.

OFDM, rather than SC-FDM, may be used for some wideband UL communications. For instance, because bandwidth edges of a CC may be reserved for a non-low latency control channel (e.g., PUCCH), SC-FDM may not be employed for a wideband data channel. So in some examples, UE 115-a may perform a joint discrete Fourier transform (DFT) (e.g., fast Fourier transform) over CCs 205. Additionally or alternatively, multi-cluster data channel assignments may be used, where each cluster may be in a CC 205.

In some examples, sounding reference signal (SRS) may be transmitted in a guard band. The additional SRS may be coordinated with in-band SRS transmissions, and may complement such in-band SRS transmissions.

In some cases, wideband DL and wideband UL may be deployed separately, or in combination with each other. For example, a wireless communications system 200 may support wideband DL and narrowband UL, wideband DL and wideband UL, and narrowband DL and wideband UL.

Various carrier configurations may also affect wideband low latency operation. For example, if one or both CCs 205 is configured for TDD, then one of the CCs 205 may have a guard period that overlaps in time with a non-guard period symbol period of the other CC 205. Or one CC 205 may have a CRS symbol that overlaps in time with a data symbol of the other CC 205. In such cases, wireless communications system 200 may fallback to narrowband operation or may use a lower number of CCs 205 or a different combination of CCs 205 for wideband low latency communication.

In some cases, wideband positioning reference signals (PRS) may be employed within wireless communications system 200, which may be used by UE 115-a and wireless communications system 200 (e.g., to improve accuracy of location identification). For example, a UE 115-a may assume a transmission phase or a fixed phase offset for the CCs 205 with wideband PRS to facilitate coherent operation. If a wideband PRS is configured across a set of CCs 205 for a UE 115-*a*, the UE 115-*a* may assume co-phasing of the set of CCs 205, for instance.

UE 115-*a* and base station 105-*a* may thus communicate using a wideband low latency configuration in which, for a CA that includes CCs 205, a TB may be mapped to resources of CCs 205-*a* and 205-*b* during a low latency TTI. The techniques discussed herein, including those described with reference to FIG. 2, may be employed to support such wideband low latency communication.

Figure 3:
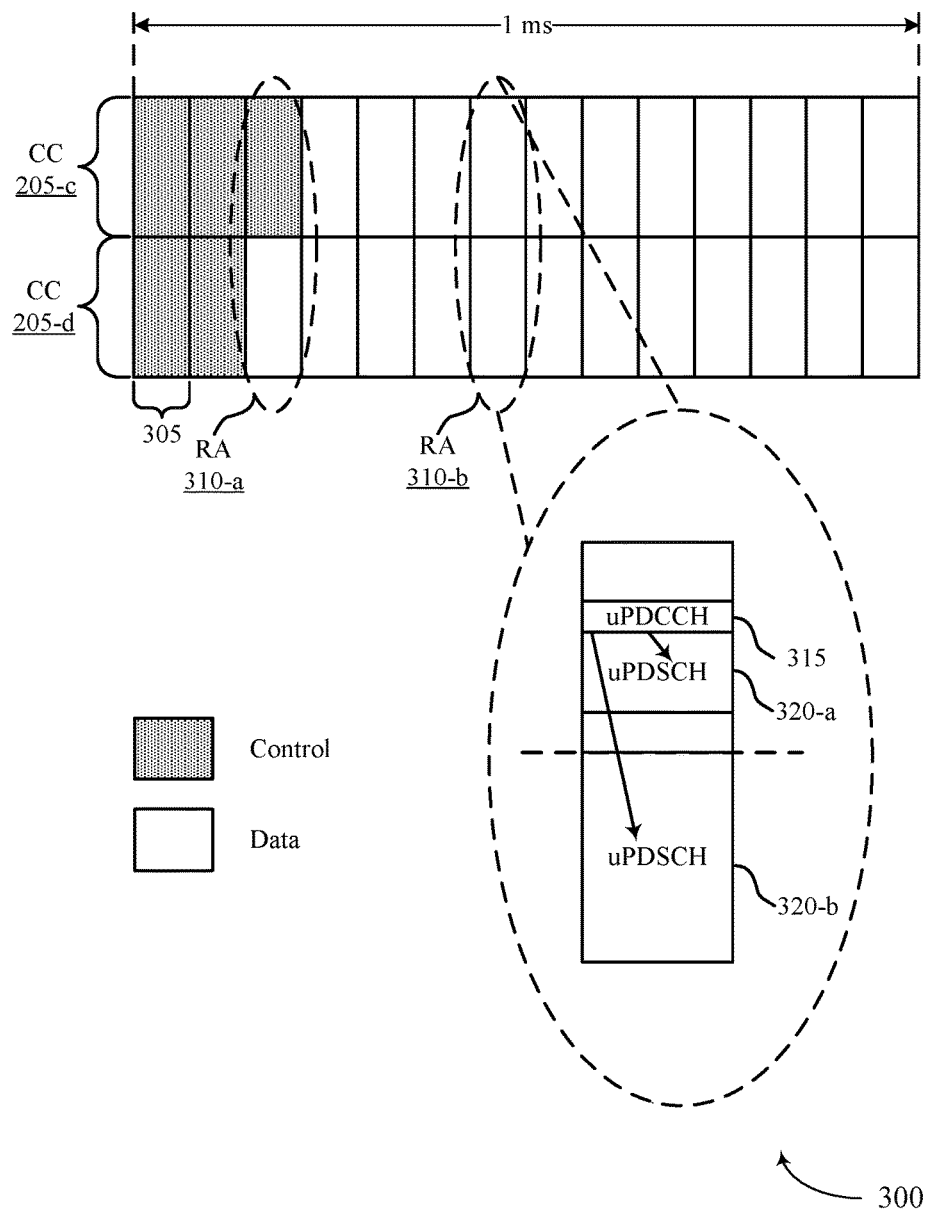
FIG. 3 illustrates an example of a wideband component carrier transmission that supports wideband low latency communication in accordance with aspects of the present disclosure.

FIG. 3 illustrates an example of a wideband component carrier transmission 300 for wideband low latency communication. In some cases, wideband component carrier transmission 300 may represent aspects of techniques performed by a UE 115 or base station 105 as described with reference to FIGS. 1-2. Wideband component carrier transmission 300 may provide an example of resource allocation over multiple CCs.

In some cases, a system may use multiple resource allocation methods, including a wideband low latency configuration. For example, multiple CCs may contain a control region or a data region, and the regions may differ during a symbol 305 of contiguous CCs. CC 205-*c* and CC 205-*d* may both include a control region during a symbol 305, for instance. Alternatively, in a different symbol 305, CC 205-*c* may include a control region, while CC 205-*d* may include a data region, as shown in resource allocation (RA) 310-*a*. In some examples, a wireless device may only use CC 205-*d*. Communication on a single CC 205-*d*, including RA 310-*a*, may be referred to as non-wideband low latency communication or a non-wideband configuration. Additionally or alternatively, a single FFT may be used with a resource allocation across both CC 205-*c* and CC 205-*d*. That is, resource allocation may be resource element group (REG)-based in CC 205-*c* and RB-based in CC 205-*d*.

In another example, CC 205-*c* and CC 205-*d* may both include data regions during a symbol 305 as shown in RA 310-*b*. Communication on a CC 205-*c* and CC 205-*d*, including RA 310-*b*, may be referred to as wideband low latency communication or a wideband configuration. In some cases, low latency control channel, uPDCCH 315, may be transmitted on resources of CC 205-*c*, and may carry scheduling information for a UE 115, such as downlink control information (DCI). In some cases, a shared channel (e.g., uPDSCH) may include resources of the data regions of CC 205-*c* and CC 205-*d*. For example, RA 310-*b* may include a low latency data or shared channel, uPDSCH 320-*a*, in CC 205-*c* and uPDSCH 320-*b* in CC 205-*d*, where the configuration may be associated with different transmission schemes. In some cases, the configuration may allow uPDSCH 320-*a* (with a portion of resources in CC 205-*c*) to have a SFBC, while uPDSCH 320-*b* (with a portion of resources in CC 205-*d*) may include a combination of FSTD and SFBC.

In some examples, a single resource allocation scheme may be employed that is specific to or depends on features of CC 205-*c* and CC 205-*d*. Additionally, in some instances, multiple resource allocation schemes (e.g., frequency diversity or frequency selectivity) may be supported. For example, if uPDSCH 320-*a* and uPDSCH 320-*b* span CC 205-*c* and CC 205-*d*, a resource allocation granularity and/or a number of bits used for resource allocation may depend on such a configuration. Additionally, in some instances, a single bit may be used to indicate whether a CC (e.g., CC 205-*c* or CC 205-*d*) is scheduled as a secondary resource allocation.

Figure 4A:
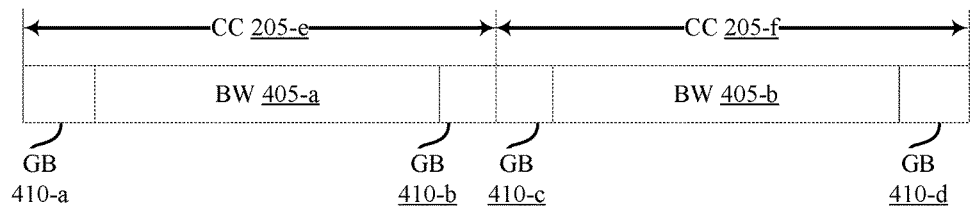
FIGS. 4A-4C illustrate examples of component carrier configurations that support wideband low latency communication in accordance with aspects of the present disclosure.
Figure 4B:
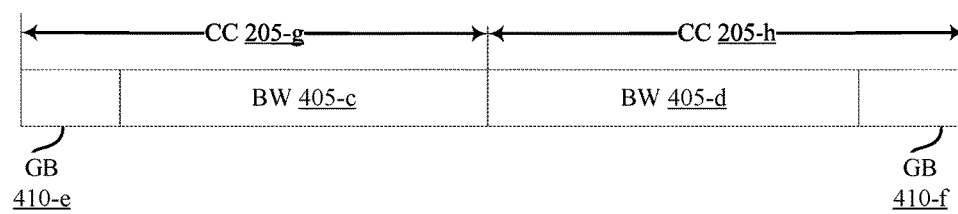
Figure 4C:
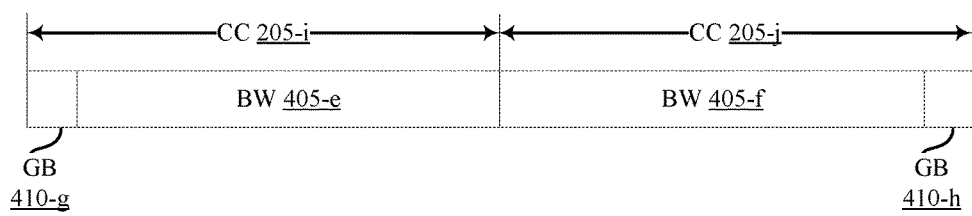

FIGS. 4A-4C illustrate an example of CC configurations 401-403 for wideband low latency communication. In some cases, CC configurations 401-403 may represent aspects of techniques performed by a UE 115 or base station 105 as described with reference to FIGS. 1-2. CC configurations may represent examples of different levels of unused resources, which may be characterized as overhead, within a wideband transmission.

CC configuration 401 may have a set overhead (e.g., an overhead of 10 percent) in CC 205-*e* and CC 205-*f*, which may each have a usable bandwidth (BW) 405-*a* and BW 405-*b*, respectively. Nominal guard band (GB) 410-*a* and GB 410-*b* may surround BW 405-*a*, and GB 410-*c* and GB 410-*d* may surround BW 405-*b*.

CC configuration 402 may be an example of a shifted GB and may have a fixed overhead. CC 205-*g* and CC 205-*h* may each have useable BW 405-*c* and BW 405-*d* with GB 410-*e* and GB 410-*f* located at opposite ends of CC 205-*g* and CC 205-*h*.

CC configuration 403 may be an example of a wideband transmission with a reduced GB and correspond to a reduced level of overhead (e.g., less than 10 percent) and increased bandwidth in each CC relative to CC configurations 401 and 402. That is, CC 205-*i* and CC 205-*j* may have an increased amount of usable BW 405-*e* and BW 405-*f*, and GB 410-*g* and GB 410-*h*, located at opposite ends of CC 205-*i* and CC 205-*j*, may have a smaller bandwidth than GB 410-*e* and GB 410-*f*, as shown in CC configuration 402.

Figure 5:
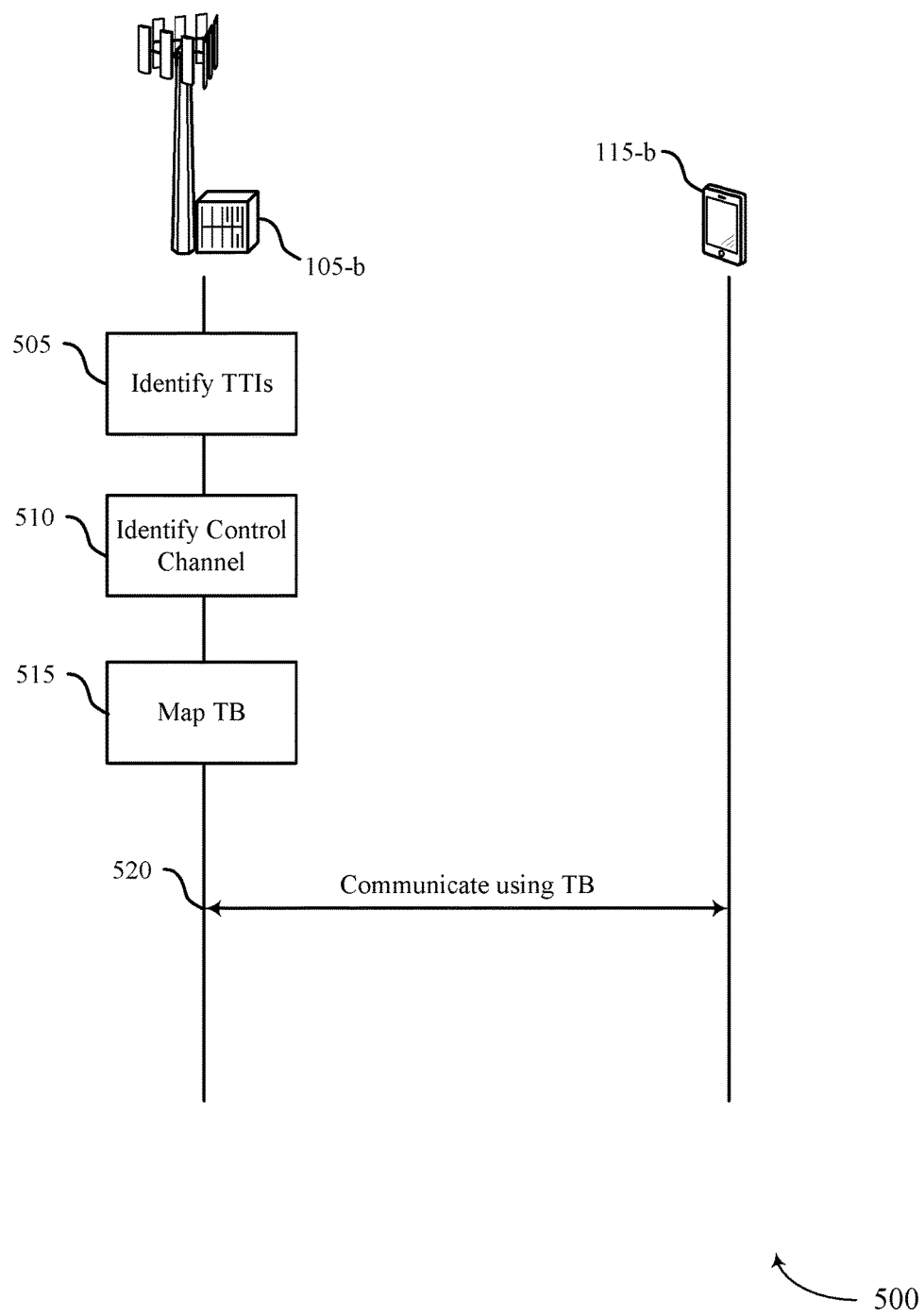
FIG. 5 illustrates an example of a process flow in a system that supports wideband low latency communication in accordance with aspects of the present disclosure.

FIG. 5 illustrates an example of a process flow 500 for wideband low latency communication in accordance with various aspects of the present disclosure. Process flow 500 may include base station 105-*b* and UE 115-*b*, which may be examples of the corresponding devices described with reference to FIG. 1-2. Both base station 105-*b* and UE 115-*b* may operate in a wireless communications system using a CA configuration having a first CC and a second CC. Although the operations of process flow 500 are described as performed by base station 105-*b*, the operations may also be performed by UE 115-*b*.

At 505, base station 105-*b* may identify a first TTI and a second TTI, wherein the second TTI has a longer duration than the first TTI. In some examples, base station 105-*b* may identify a third TTI that has a shorter duration than the second TTI. In some examples, the first and second TTI include different PRG configurations. In some cases, the first and second CC use different resource allocation methods or different modulation orders, or both. In some cases, the resources of the first CC or the resources of the second CC, or both, include guard band resources. At 510, base station 105-*b* may identify a control channel transmission that assigns the resources of the first CC and the resources of the second CC.

At 515, base station 105-*b* may map a TB within the first TTI according to a wideband configuration that includes resources of the first CC and resources of the second CC. In some cases, the TB may be an uplink TB or a downlink TB. In some examples, base station 105-*b* may map the second TB within the third TTI according to a non-wideband configuration that includes resources of the first CC and excludes resources of the second CC.

At 520, base station 105-*b* may communicate using the TB during the first TTI on the resources of the first CC and the resources of the second CC, where communicating may include transmitting or receiving the TB. In some cases, base station 105-*b* may communicate using a second TB in a different direction than the TB using a non-wideband configuration that includes other resources of the first CC or other resources of the second CC. For example, the first TB may include UL data or control, or both, and the second TB may include DL data or control, or both. Or the first TB may be used for DL and the second TB may be used for UL. In some examples, base station 105-*b* may communicate using a second TB during the third TTI on the resources of the first CC.

In some examples, base station 105-*b* may determine that the second CC includes at least one of a control region, a multicast-broadcast single frequency network (MBSFN) region, a guard period, an uplink subframe, or a cell-specific reference signal (CRS), or any combination thereof, during the third TTI. Mapping of the second TB may be based on the determination that the second CC includes a control region, MBSFN, guard period, uplink subframe, CRS, or the like.

Figure 6:
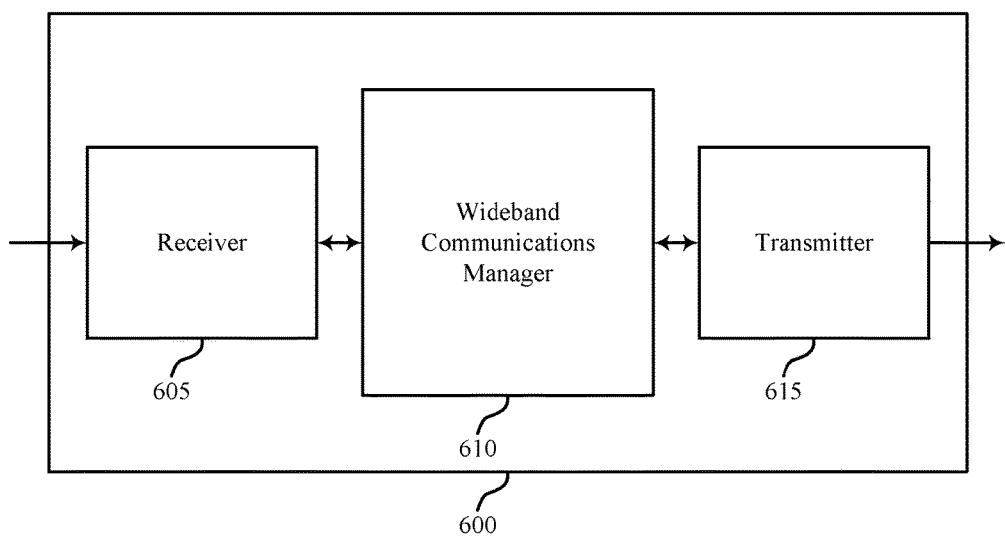
FIGS. 6 through 8 show block diagrams of a wireless device that supports wideband low latency communication in accordance with aspects of the present disclosure.

FIG. 6 shows a block diagram of a wireless device 600 that supports wideband low latency communication in accordance with various aspects of the present disclosure. Wireless device 600 may be an example of aspects of a UE 115 or base station 105 described with reference to FIGS. 1 and 2. Wireless device 600 may include receiver 605, wideband communications manager 610, and transmitter 615. Wireless device 600 may also include a processor. Each of these components may be in communication with one another.

The receiver 605 may receive information such as packets, user data, or control information associated with various information channels (e.g., control channels, data channels, and information related to wideband low latency communication, etc.). Information may be passed on to other components of the device. The receiver 605 may be an example of aspects of the transceiver 925 described with reference to FIG. 9.

The wideband communications manager 610 may identify a first TTI and a second TTI, where the second TTI has a longer duration than the first TTI. The wideband communications manager 610 may map a TB within the first TTI according to a wideband configuration that includes resources of the first CC and resources of the second CC. The wideband communications manager 610, in combination with the receiver 605 or transmitter 615, may use the TB to communicate during the first TTI on the resources of the first CC and the resources of the second CC. The wideband communications manager 610 may also be an example of aspects of the wideband communications manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
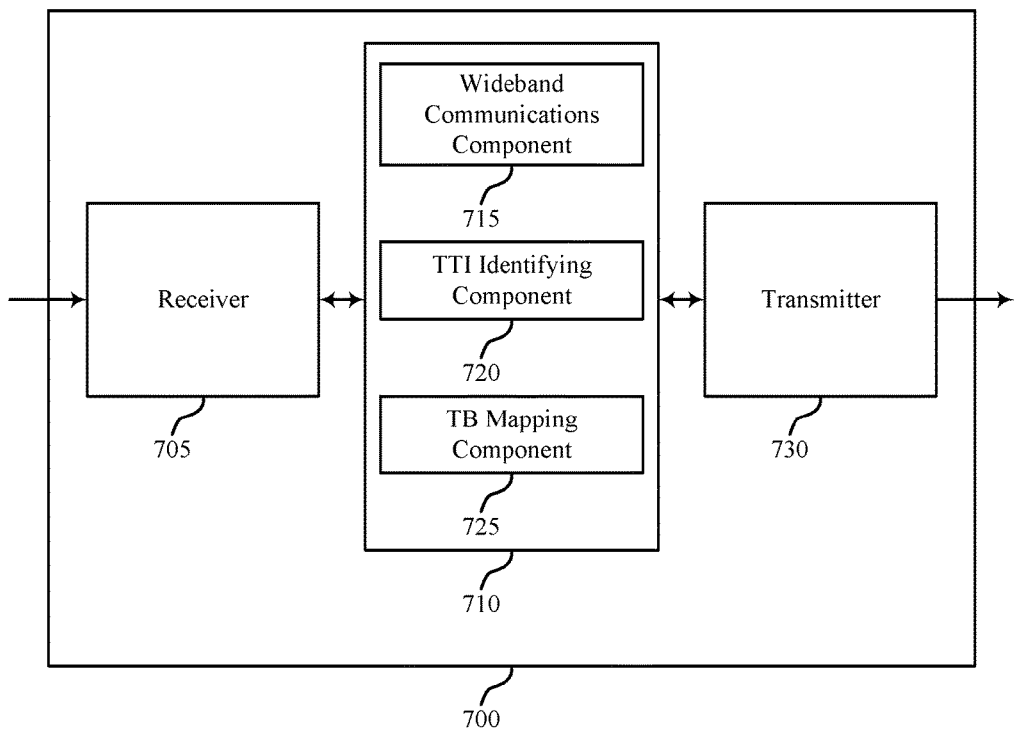

FIG. 7 shows a block diagram of a wireless device 700 that supports wideband low latency communication in accordance with various aspects of the present disclosure. Wireless device 700 may be an example of aspects of a wireless device 600 or a UE 115 or base station 105 described with reference to FIGS. 1, 2 and 6. Wireless device 700 may include receiver 705, wideband communications manager 710, and transmitter 730. Wireless device 700 may also include a processor. Each of these components may be in communication with one another.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The wideband communications manager 710 may be an example of aspects of wideband communications manager 610 described with reference to FIG. 6. The wideband communications manager 710 may include wideband communications component 715, TTI identifying component 720, and TB mapping component 725. The wideband communications manager 710 may be an example of aspects of the wideband communications manager 905 described with reference to FIG. 9.

The wideband communications component 715 may use the TB to communicate, which may include transmitting the TB or receiving the TB in combination with receiver 705 and transmitter 730. The wideband communications component may also, in combination with receiver 705 or transmitter 730, use a second TB to communicate in a different direction than the TB using a non-wideband configuration that includes other resources of the first CC or other resources of the second CC. In some examples, the wideband communications component 715 may use the TB to communicate during the first TTI on the resources of the first CC and the resources of the second CC. In some cases, the TB is an UL TB or a DL TB. In some cases, the first CC and the second CC include a same number of DMRS ports. As described herein, a quasi-co-location indication may be configured for the first CC and the second CC, and may be identified by the wideband communications component 715.

The TTI identifying component 720 may identify a first TTI and a second TTI, where the second TTI has a longer duration than the first TTI. The TTI identifying component 720 may identify a third TTI that has a shorter duration than the second TTI. In some cases, the first TTI includes two or more symbols.

The TB mapping component 725 may map a TB within the first TTI according to a wideband configuration that includes resources of the first CC and resources of the second CC. The TB mapping component 725 may map the second TB within the third TTI according to a non-wideband configuration that includes resources of the first CC and excludes resources of the second CC. In some cases, the first CC and the second CC use different resource allocation methods or different modulation orders, or both. In some cases, the resources of the first CC or the resources of the second CC, or both, include guard band resources. In some cases, the first TTI and the second TTI include different precoding RB group (PRG) configurations.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8:
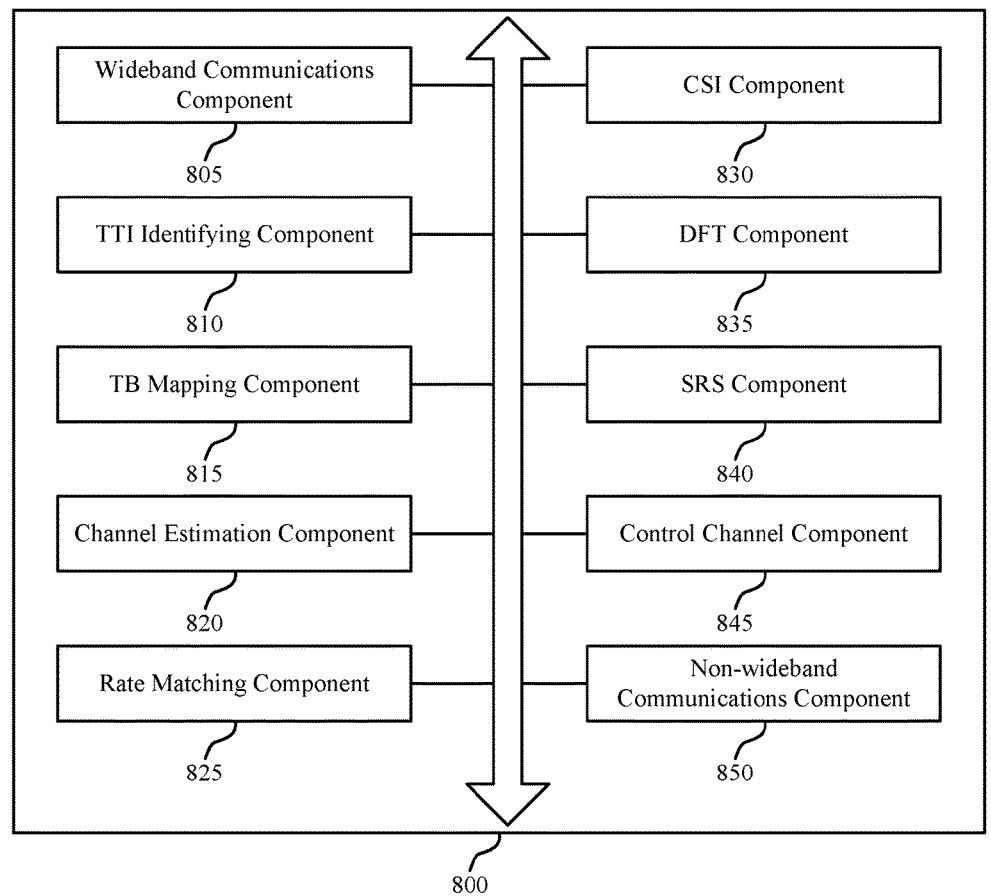

FIG. 8 shows a block diagram of a wideband communications manager 800 which may be an example of the corresponding component of wireless device 600 or wireless device 700. That is, wideband communications manager 800 may be an example of aspects of wideband communications manager 610 or wideband communications manager 710 described with reference to FIGS. 6 and 7. The wideband communications manager 800 may also be an example of aspects of the wideband communications manager 905 described with reference to FIG. 9.

The wideband communications manager 800 may include wideband communications component 805, TTI identifying component 810, TB mapping component 815, channel estimation component 820, rate matching component 825, CSI component 830, DFT component 835, SRS component 840, control channel component 845 and non-wideband communications component 850. Each of these modules may communicate, directly or indirectly, with one another (e.g., via one or more buses).

The wideband communications component 805 may use the TB to communicate, which may include transmitting the TB or receiving the TB in combination with other components. The wideband communications component 805 may use a second TB to communicate in a different direction than the TB using a non-wideband configuration that includes other resources of the first CC or other resources of the second CC, and use the TB to communicate during the first TTI on the resources of the first CC and the resources of the second CC. In some cases, the TB is an UL TB or a DL TB. In some cases, the first CC and the second CC include a same number of DMRS ports.

The TTI identifying component 810 may identify a first TTI and a second TTI, where the second TTI has a longer duration than the first TTI; and it may identify a third TTI that has a shorter duration than the second TTI. In some cases, the first TTI includes two or more symbols.

The TB mapping component 815 may map a TB within the first TTI according to a wideband configuration that includes resources of the first CC and resources of the second CC; and it may map the second TB within the third TTI according to a non-wideband configuration that includes resources of the first CC and excludes resources of the second CC. In some cases, the first CC and the second CC use different resource allocation methods or different modulation orders, or both. In some cases, the resources of the first CC or the resources of the second CC, or both, include guard band resources. In some cases, the first TTI and the second TTI include different PRG configurations.

In some cases, a resource allocation scheme for the TB is based on a number of CCs used for mapping the TB. A resource allocation scheme may include a frequency diversity scheme or a frequency selectivity scheme. In some cases, a RB indexing configuration is based on a bandwidth of the first CC and the second CC. In some cases, a code block scheme for the TB is based on combined resources from the first CC and the second CC. In some examples, a first portion of the TB is mapped to the resources of the first CC using a first code block scheme and a second portion of the TB is mapped to the resources of the second CC using a second code block scheme. A first MCS may be used for the first CC and a second MCS may be used for the second CC. In some cases, the resources of the first CC include a first UL-SCH cluster and the resources of the second CC include a second UL-SCH cluster.

The channel estimation component 820 may perform a first channel estimation for the first CC and a second channel estimation for the second CC, where the TB may be communicated based on the first channel estimation and the second channel estimation. In some cases, the first CC has a first CRS port configuration and the second CC has a second CRS port configuration, and the first channel estimation may be based on the first CRS port configuration and the second channel estimation may be based on the second CRS port configuration.

The rate matching component 825 may perform a first rate matching procedure for the first CC and a second rate matching procedure for the second CC, where the TB may be communicated based on the first rate matching procedure and the second rate matching procedure. The CSI component 830 may identify a same CSI report for the first CC and the second CC. In some cases, the first CC has a first CSI reference signal (CSI-RS) port configuration and the second CC has a second CSI-RS configuration.

The DFT component 835 may perform a joint discrete Fourier transform (DFT) operation on the TB over the first CC and the second CC. The SRS component 840 may communicate using an SRS in a guard band of the first CC or the second CC, or both. The control channel component 845 may identify a control channel transmission that assigns the resources of the first CC and the resources of the second CC.

The non-wideband communications component 850 may use the second TB to communicate during the third TTI on the resources of the first CC, and determine that the second CC includes at least one of a control region, a MBSFN region, a guard period, an UL subframe, or a CRS, or any combination thereof, during the third TTI, where mapping the second TB may be based on the determination.

Figure 9:
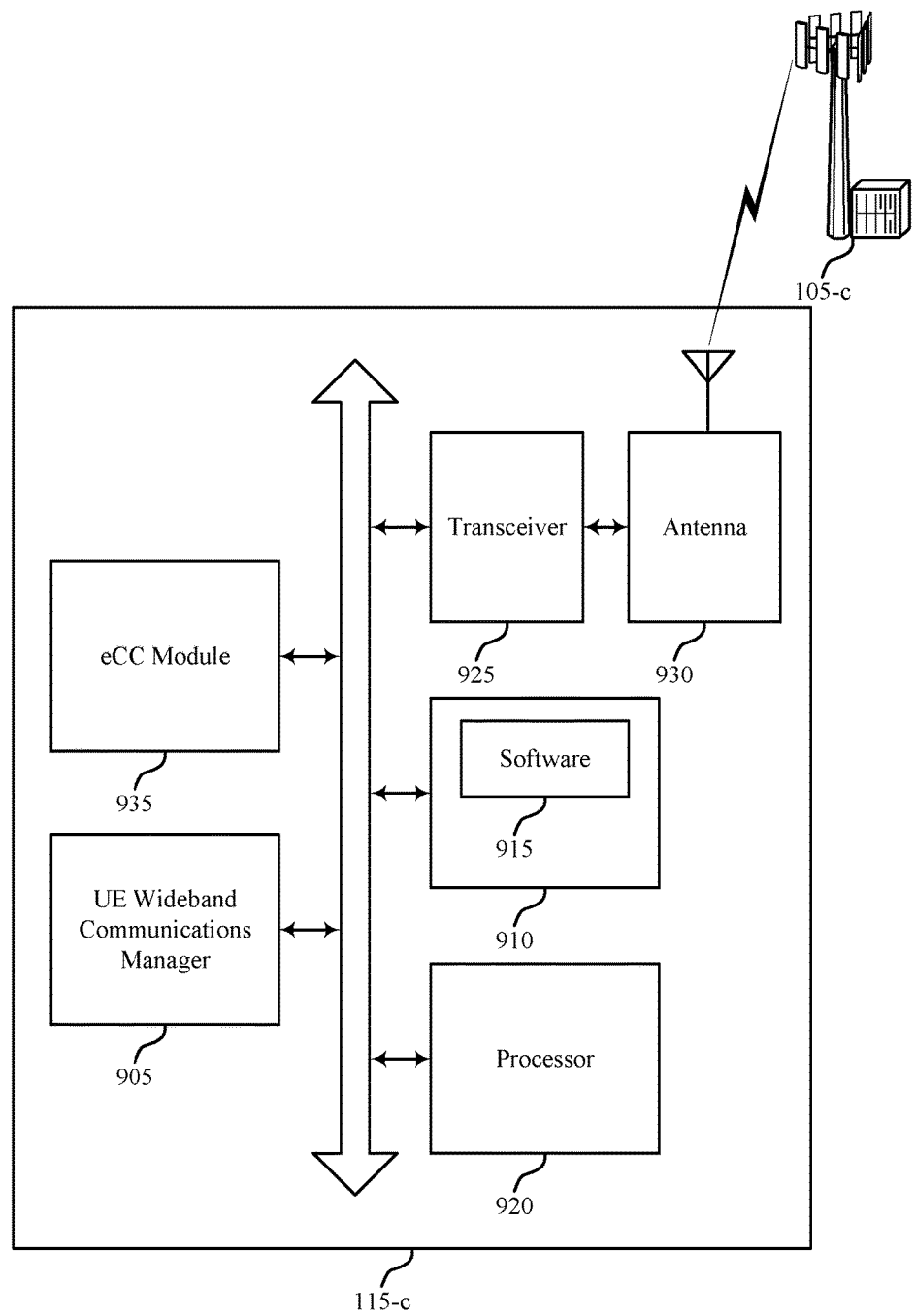
FIG. 9 illustrates a block diagram of a system including a UE that supports wideband low latency communication in accordance with aspects of the present disclosure.

FIG. 9 shows a diagram of a system 900 including a device that supports wideband low latency communication in accordance with various aspects of the present disclosure. For example, system 900 may include UE 115-c, which may be an example of a wireless device 600, a wireless device 700, or a UE 115 as described with reference to FIGS. 1, 2, and 6 through 8.

UE 115-c may also include UE wideband communications manager 905, memory 910, processor 920, transceiver 925, and antenna 930, and eCC module 935. Each of these modules may communicate, directly or indirectly, with one another (e.g., via one or more buses). The UE wideband communications manager 905 may be an example of a UE wideband communications manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., wideband low latency communication, etc.).

In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas.

In some cases, the wireless device may include a single antenna 930. However, in some cases the device may have more than one antenna 930, which may be capable of concurrently transmitting or receiving multiple wireless transmissions. The eCC module 935 may enable operations using enhanced component carriers (eCCs) such as communication using shared or unlicensed spectrum, using reduced TTIs or subframe durations, or using a large number of component carriers.

Figure 10:
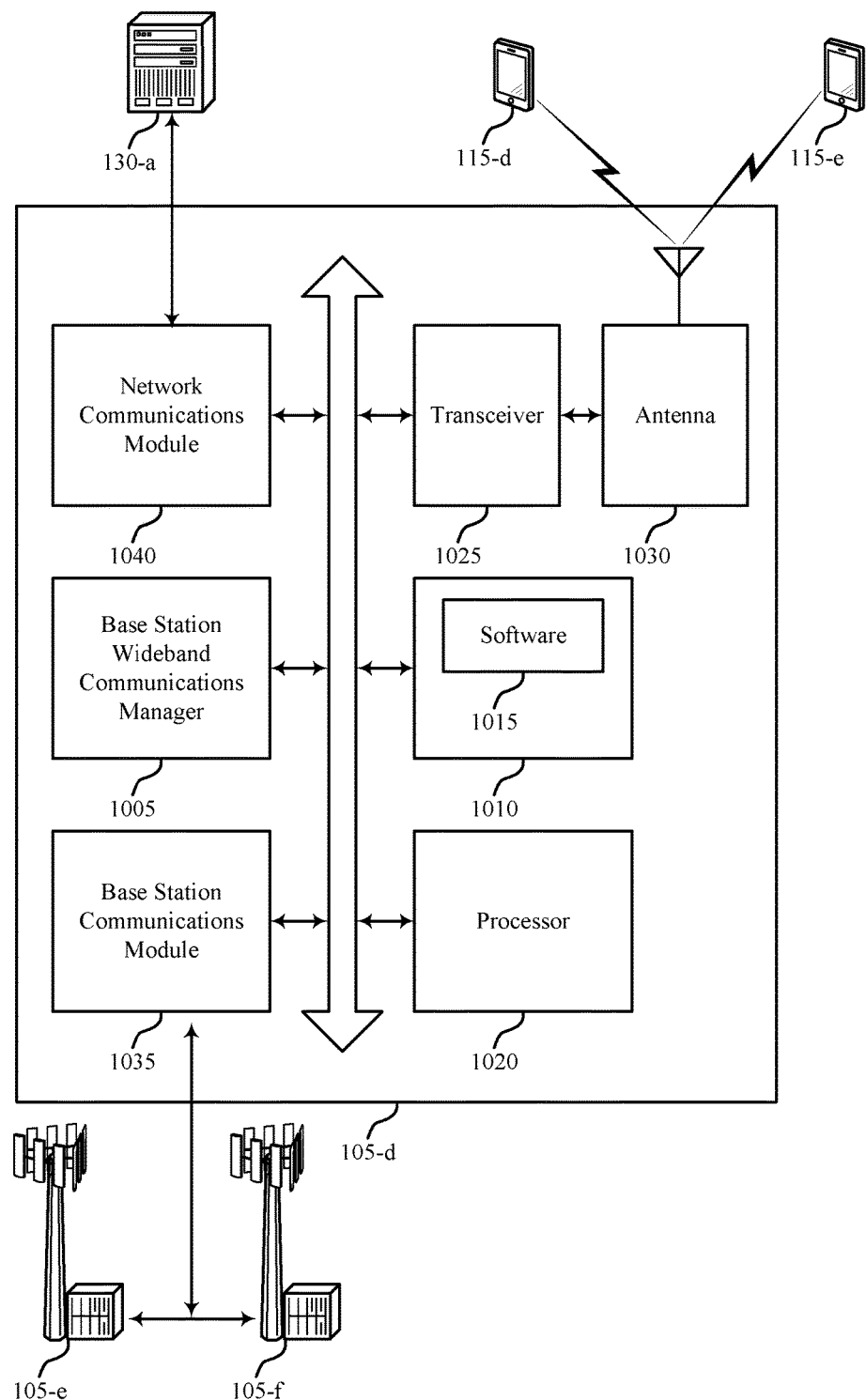
FIG. 10 illustrates a block diagram of a system including a base station that supports wideband low latency communication in accordance with aspects of the present disclosure.

FIG. 10 shows a diagram of a wireless system 1000 including a device configured that supports wideband low latency communication in accordance with various aspects of the present disclosure. For example, wireless system 1000 may include base station 105-*d*, which may be an example of a wireless device 600, a wireless device 700, or a base station 105 as described with reference to FIGS. 1, 2 and 6 through 8. Base station 105-*d* may also include components for bi-directional voice and data communications including components for transmitting communications and components for receiving communications. For example, base station 105-*d* may communicate bi-directionally with one or more UEs 115 (e.g., UE 115-*d* and UE 115-*e*).

Base station 105-*d* may also include base station wideband communications manager 1005, memory 1010, processor 1020, transceiver 1025, antenna 1030, base station communications module 1035, and network communications module 1040. Each of these modules may communicate, directly or indirectly, with one another (e.g., via one or more buses). The base station wideband communications manager 1005 may be an example of a base station wideband communications manager as described with reference to FIGS. 6 through 8.

The memory 1010 may include RAM and ROM. The memory 1010 may store computer-readable, computer-executable software including instructions that, when executed, cause the processor to perform various functions described herein (e.g., wideband low latency communication, etc.). In some cases, the software 1015 may not be directly executable by the processor but may cause a computer (e.g., when compiled and executed) to perform functions described herein. The processor 1020 may include an intelligent hardware device, (e.g., a CPU, a microcontroller, an ASIC, etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions.

The base station communications module 1035 may manage communications with other base stations 105, and may include a controller or scheduler for controlling communications with UEs 115 in cooperation with other base stations 105. For example, the base station communications module 1035 may coordinate scheduling for transmissions to UEs 115 for various interference mitigation techniques such as beamforming or joint transmission. In some examples, base station communications module 1035 may provide an X2 interface within an LTE/LTE-A wireless communication network technology to provide communication between base stations 105.

The network communications module 1040 may manage communications with the core network (e.g., via one or more wired backhaul links). For example, the network communications module 1040 may manage the transfer of data communications for client devices, such as one or more UEs 115.

Figure 11:
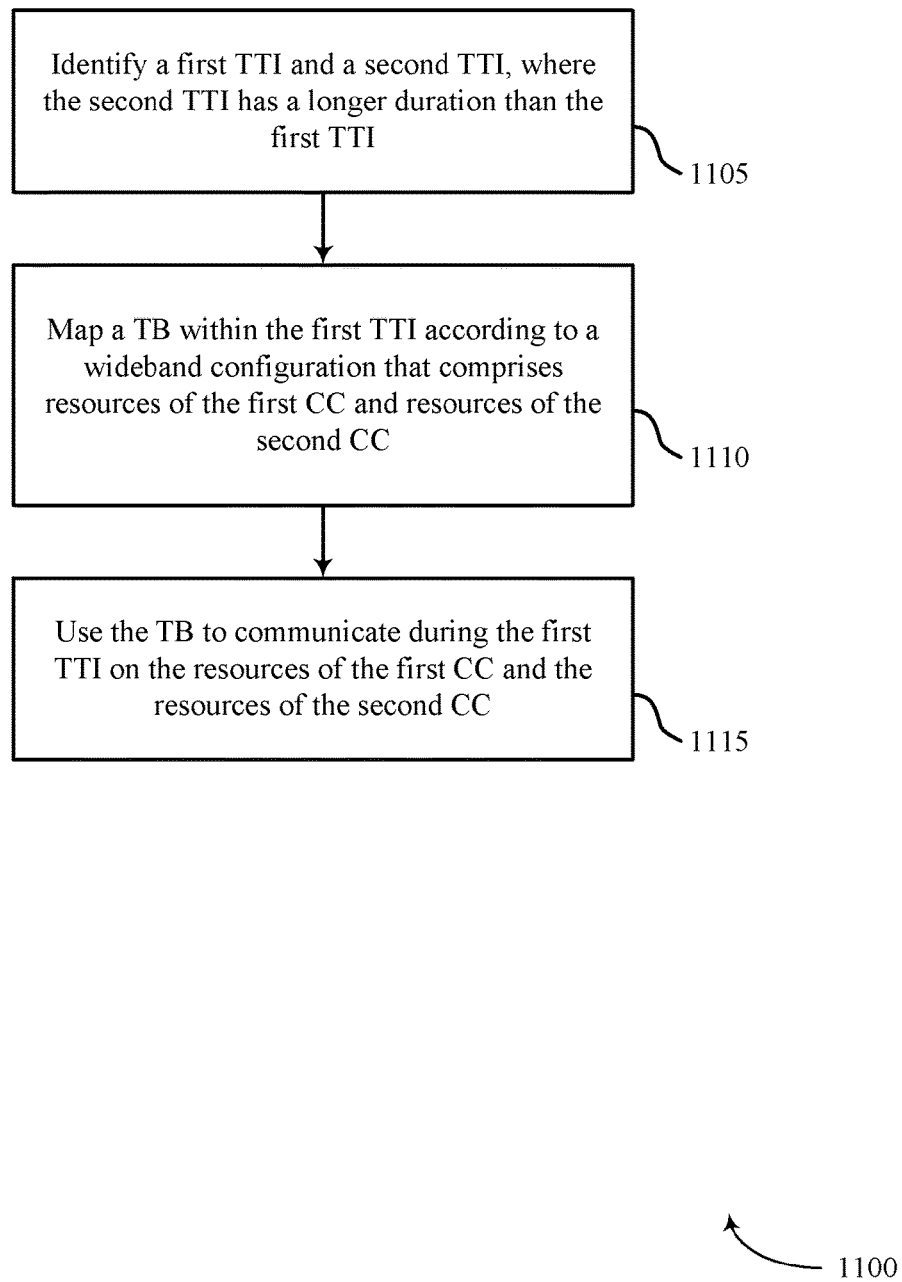
FIGS. 11 through 15 illustrate methods for wideband low latency communication in accordance with aspects of the present disclosure.

FIG. 11 shows a flowchart illustrating a method 1100 for wideband low latency communication in accordance with various aspects of the present disclosure. The operations of method 1100 may be implemented by a device such as a UE 115 or base station 105 or its components as described with reference to FIGS. 1, 2, and 6 through 10. For example, the operations of method 1100 may be performed by the wideband communications manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1105, the UE 115 or base station 105 may identify a first TTI and a second TTI, where the second TTI has a longer duration than the first TTI as described above with reference to FIGS. 2 through 5. In certain examples, the operations of block 1105 may be performed by the TTI identifying component as described with reference to FIGS. 7 and 8.

At block 1110, the UE 115 or base station 105 may map a TB within the first TTI according to a wideband configuration that includes resources of the first CC and resources of the second CC as described above with reference to FIGS. 2 through 5. In certain examples, the operations of block 1110 may be performed by the TB mapping component as described with reference to FIGS. 7 and 8.

At block 1115, the UE 115 or base station 105 may use the TB to communicate during the first TTI on the resources of the first CC and the resources of the second CC as described above with reference to FIGS. 2 through 5. In certain examples, the operations of block 1115 may be performed by the wideband communications component as described with reference to FIGS. 7 and 8.

Figure 12:
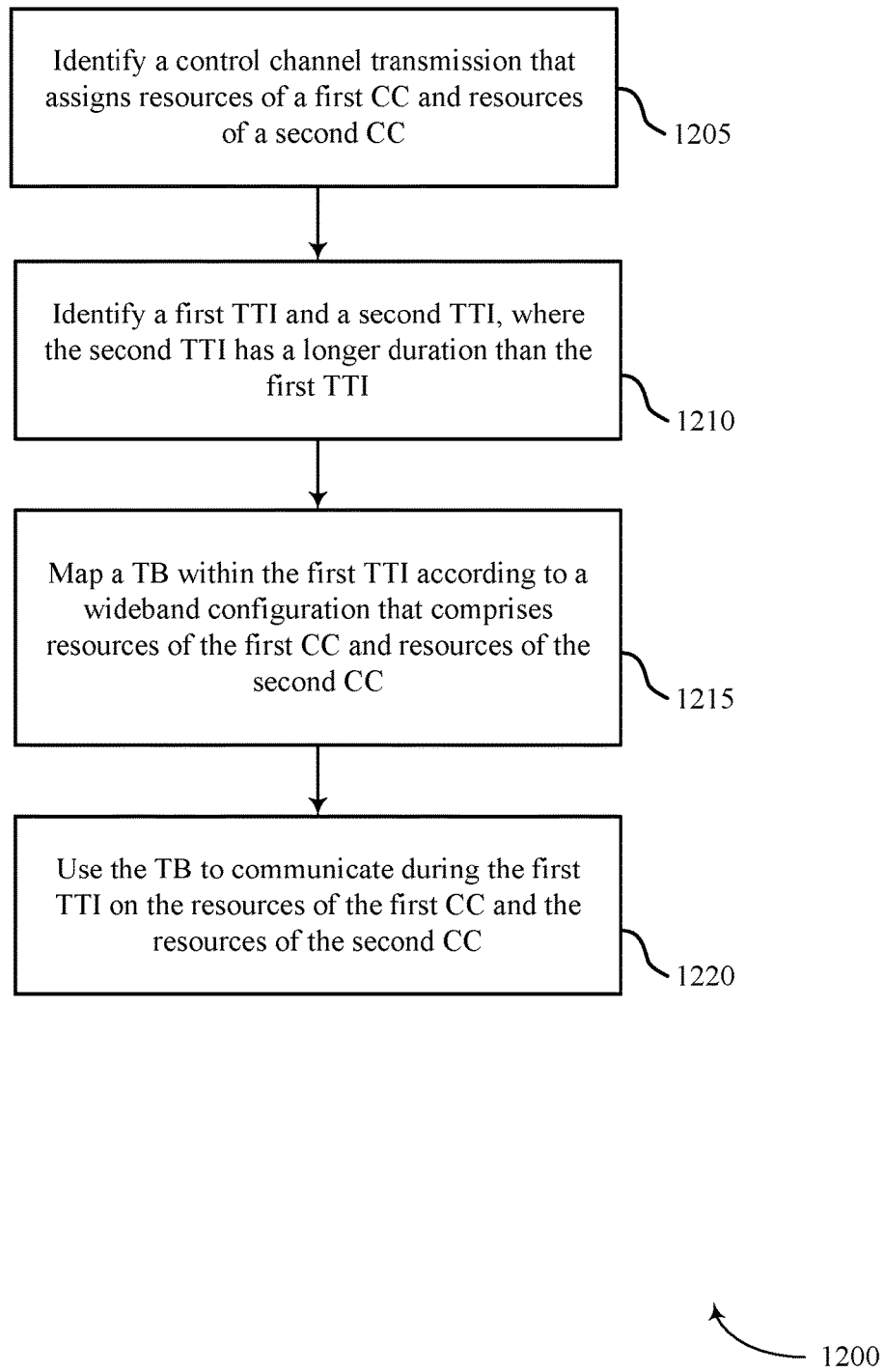

FIG. 12 shows a flowchart illustrating a method 1200 for wideband low latency communication in accordance with various aspects of the present disclosure. The operations of method 1200 may be implemented by a device such as a UE 115 or base station 105 or its components as described with reference to FIGS. 1, 2, and 6 through 10. For example, the operations of method 1200 may be performed by the wideband communications manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may identify a control channel transmission that assigns resources of a first CC and resources of the second CC as described above with reference to FIGS. 2 through 5. In certain examples, the operations of block 1220 may be performed by the control channel component as described with reference to FIGS. 7 and 8.

At block 1210, the UE 115 or base station 105 may identify a first TTI and a second TTI, where the second TTI has a longer duration than the first TTI as described above with reference to FIGS. 2 through 5. In certain examples, the operations of block 1205 may be performed by the TTI identifying component as described with reference to FIGS. 7 and 8.

At block 1215, the UE 115 or base station 105 may map a TB within the first TTI according to a wideband configuration that includes the resources of the first CC and the resources of the second CC as described above with reference to FIGS. 2 through 5. In certain examples, the operations of block 1210 may be performed by the TB mapping component as described with reference to FIGS. 7 and 8.

At block 1220, the UE 115 or base station 105 may use the TB to communicate during the first TTI on the resources of the first CC and the resources of the second CC as described above with reference to FIGS. 2 through 5. In certain examples, the operations of block 1215 may be performed by the wideband communications component as described with reference to FIGS. 7 and 8.

Figure 13:
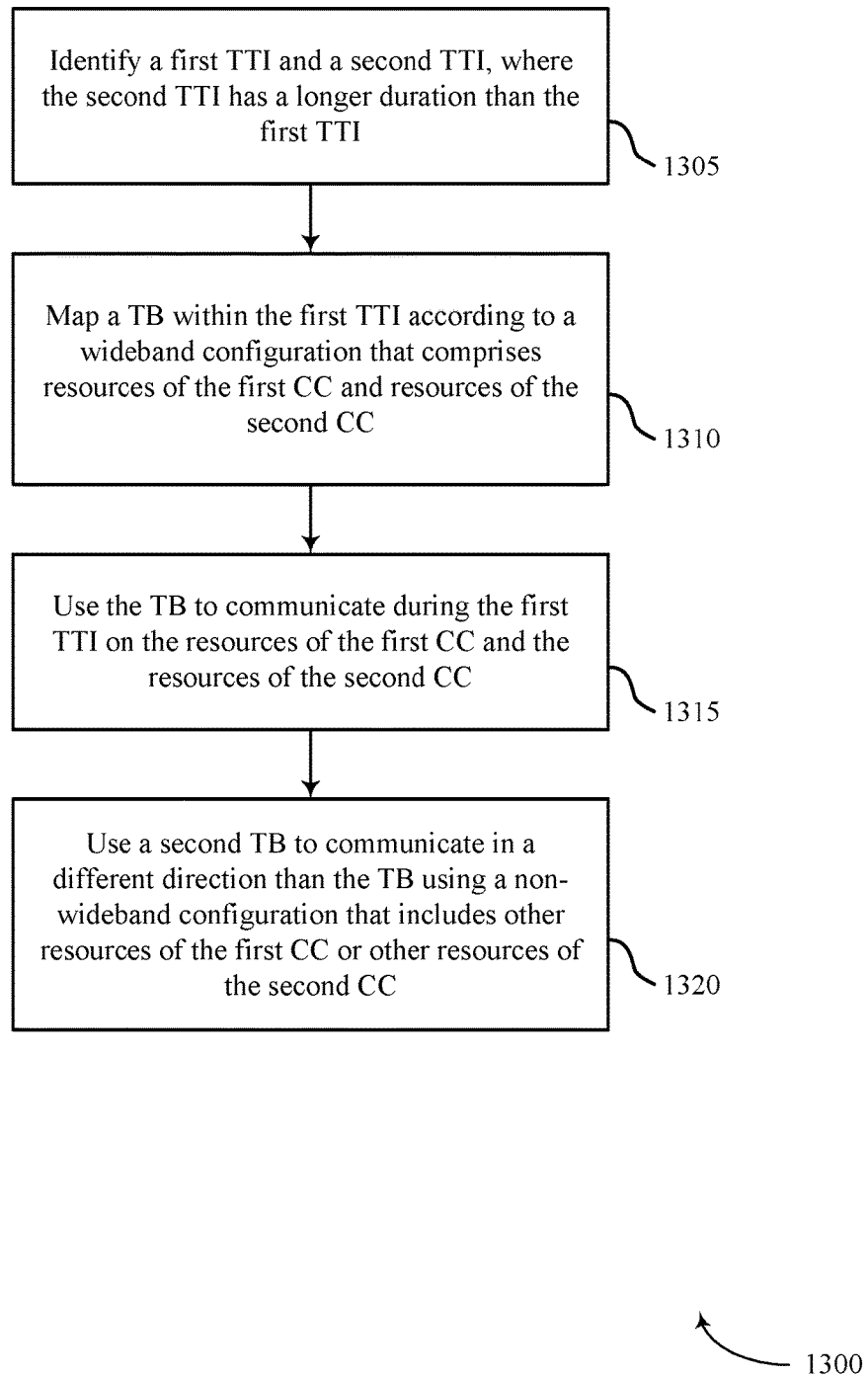

FIG. 13 shows a flowchart illustrating a method 1300 for wideband low latency communication in accordance with various aspects of the present disclosure. The operations of method 1300 may be implemented by a device such as a UE 115 or base station 105 or its components as described with reference to FIGS. 1, 2, and 6 through 10. For example, the operations of method 1300 may be performed by the wideband communications manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1305, the UE 115 or base station 105 may identify a first TTI and a second TTI, where the second TTI has a longer duration than the first TTI as described above with reference to FIGS. 2 through 5. In certain examples, the operations of block 1305 may be performed by the TTI identifying component as described with reference to FIGS. 7 and 8.

At block 1310, the UE 115 or base station 105 may map a TB within the first TTI according to a wideband configuration that includes resources of the first CC and resources of the second CC as described above with reference to FIGS. 2 through 5. In certain examples, the operations of block 1310 may be performed by the TB mapping component as described with reference to FIGS. 7 and 8.

At block 1315, the UE 115 or base station 105 may use the TB to communicate during the first TTI on the resources of the first CC and the resources of the second CC as described above with reference to FIGS. 2 through 5. In certain examples, the operations of block 1315 may be performed by the wideband communications component as described with reference to FIGS. 7 and 8.

At block 1320, the UE 115 or base station 105 may use a second TB to communicate in a different direction than the TB using a non-wideband configuration that includes other resources of the first CC or other resources of the second CC as described above with reference to FIGS. 2 through 5. In certain examples, the operations of block 1320 may be performed by the wideband communications component as described with reference to FIGS. 7 and 8.

Figure 14:
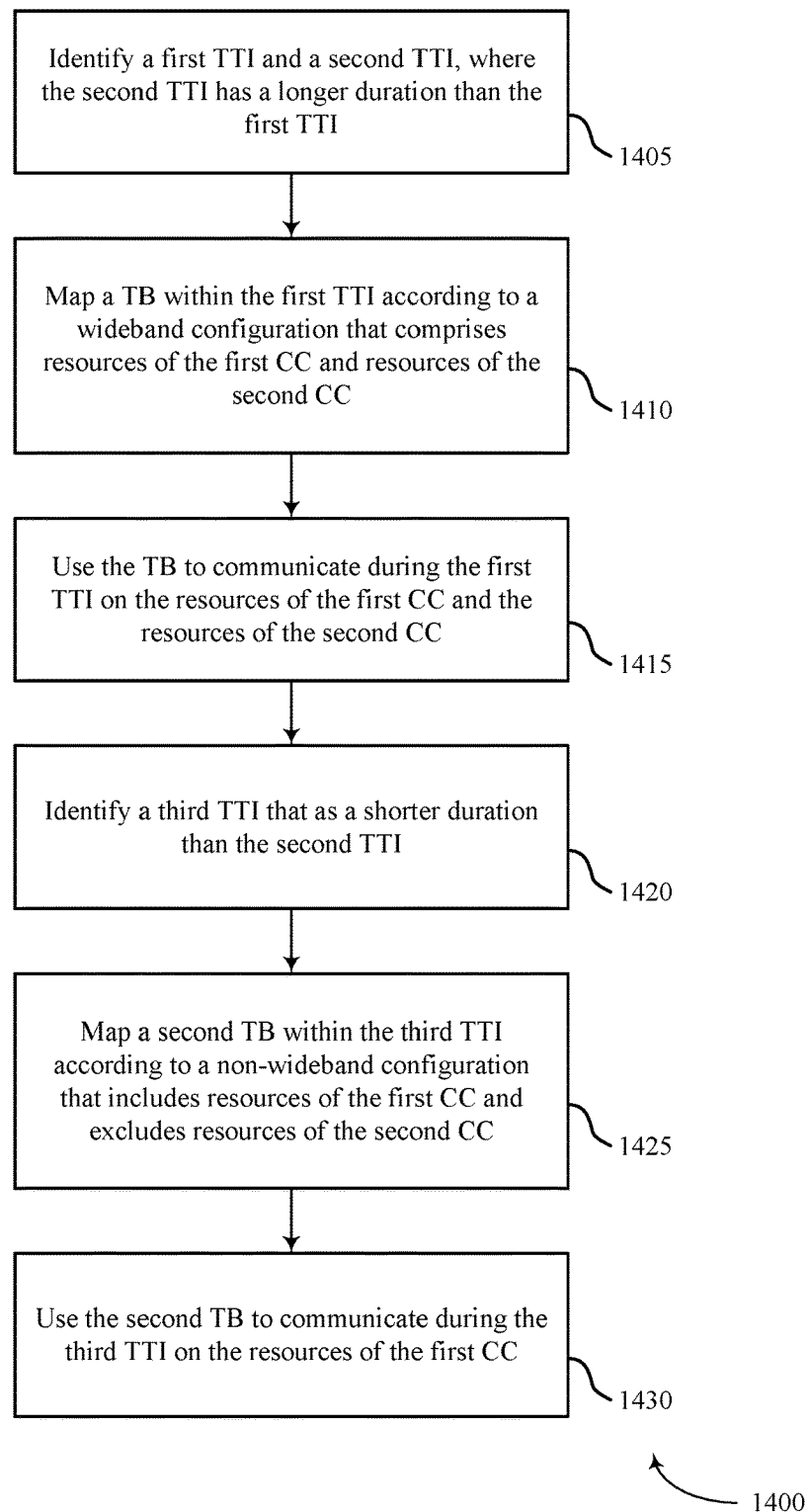

FIG. 14 shows a flowchart illustrating a method 1400 for wideband low latency communication in accordance with various aspects of the present disclosure. The operations of method 1400 may be implemented by a device such as a UE 115 or base station 105 or its components as described with reference to FIGS. 1, 2, and 6 through 10. For example, the operations of method 1400 may be performed by the wideband communications manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1405, the UE 115 or base station 105 may identify a first TTI and a second TTI, where the second TTI has a longer duration than the first TTI as described above with reference to FIGS. 2 through 5. In certain examples, the operations of block 1405 may be performed by the TTI identifying component as described with reference to FIGS. 7 and 8.

At block 1410, the UE 115 or base station 105 may map a TB within the first TTI according to a wideband configuration that includes resources of the first CC and resources of the second CC as described above with reference to FIGS. 2 through 5. In certain examples, the operations of block 1410 may be performed by the TB mapping component as described with reference to FIGS. 7 and 8.

At block 1415, the UE 115 or base station 105 may use the TB to communicate during the first TTI on the resources of the first CC and the resources of the second CC as described above with reference to FIGS. 2 through 5. In certain examples, the operations of block 1415 may be performed by the wideband communications component as described with reference to FIGS. 7 and 8.

At block 1420, the UE 115 or base station 105 may identify a third TTI that has a shorter duration than the second TTI as described above with reference to FIGS. 2 through 5. In certain examples, the operations of block 1420 may be performed by the TTI identifying component as described with reference to FIGS. 7 and 8.

At block 1425, the UE 115 or base station 105 may map a second TB within the third TTI according to a non-wideband configuration that includes resources of the first CC and excludes resources of the second CC as described above with reference to FIGS. 2 through 5. In certain examples, the operations of block 1425 may be performed by the TB mapping component as described with reference to FIGS. 7 and 8.

At block 1430, the UE 115 or base station 105 may use the second TB to communicate during the third TTI on the resources of the first CC as described above with reference to FIGS. 2 through 5. In certain examples, the operations of block 1430 may be performed by the non-wideband commmunications component as described with reference to FIGS. 7 and 8.

Figure 15:
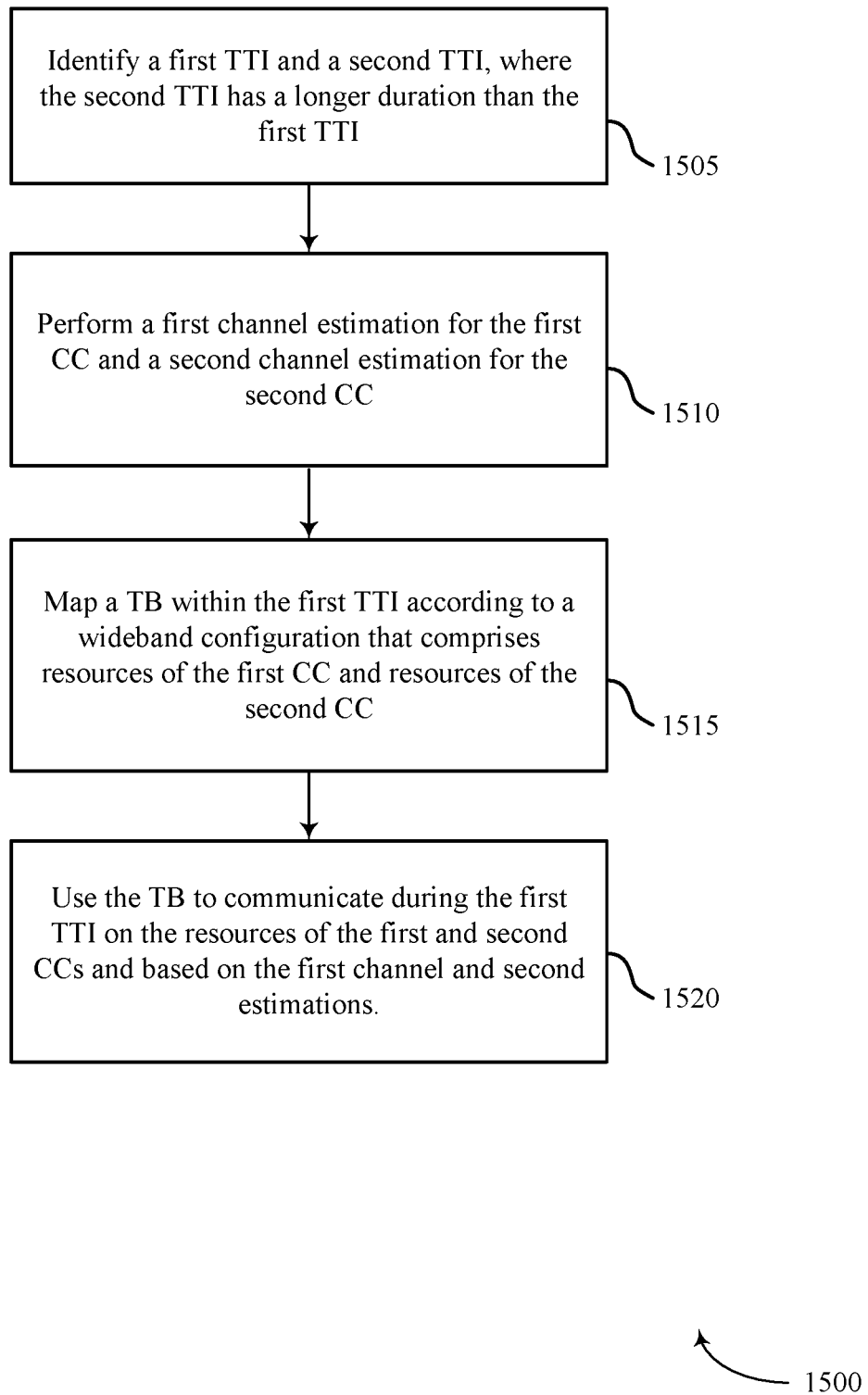

FIG. 15 shows a flowchart illustrating a method 1500 for wideband low latency communication in accordance with various aspects of the present disclosure. The operations of method 1500 may be implemented by a device such as a UE 115 or base station 105 or its components as described with reference to FIGS. 1, 2, and 6 through 10. For example, the operations of method 1500 may be performed by the wideband communications manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1505, the UE 115 or base station 105 may identify a first TTI and a second TTI, where the second TTI has a longer duration than the first TTI as described above with reference to FIGS. 2 through 5. In certain examples, the operations of block 1505 may be performed by the TTI identifying component as described with reference to FIGS. 7 and 8.

At block 1510, the UE 115 or base station 105 may perform a first channel estimation for the first CC and a second channel estimation for the second CC, where the TB is communicated based on the first channel estimation and the second channel estimation as described above with reference to FIGS. 2 through 5. In certain examples, the operations of block 1510 may be performed by the channel estimation component as described with reference to FIGS. 7 and 8.

At block 1515, the UE 115 or base station 105 may map a TB within the first TTI according to a wideband configuration that includes resources of the first CC and resources of the second CC as described above with reference to FIGS. 2 through 5. In certain examples, the operations of block 1515 may be performed by the TB mapping component as described with reference to FIGS. 7 and 8.

At block 1520, the UE 115 or base station 105 may use the TB to communicate during the first TTI on the resources of the first CC and the resources of the second CC as described above with reference to FIGS. 2 through 5. In certain examples, the operations of block 1520 may be performed by the wideband communications component as described with reference to FIGS. 7 and 8.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for wideband low latency communication.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for wideband low latency communication. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method of wireless communication using a carrier aggregation (CA) configuration having a first component carrier (CC) and a second CC comprising:
   identifying a first transmission time interval (TTI) and a second TTI, wherein the second TTI has a longer duration than the first TTI;

identifying a control channel transmission on the first CC that assigns resources of both of the first CC and the resources of the second CC;

mapping a transport block (TB) within the first TTI according to a wideband configuration that comprises the resources of the first CC and resources of the second CC; and using the TB to communicate during the first TTI on the resources of the first CC and the resources of the second CC.

2. The method of claim 1, wherein using the TB to communicate comprises:

transmitting the TB or receiving the TB.

3. The method of claim 1, further comprising:

using a second TB to communicate, in a different direction than the TB, using a non-wideband configuration that comprises other resources of the first CC or other resources of the second CC.

4. The method of claim 1, wherein the TB is an uplink (UL) TB or a downlink (DL) TB.

5. The method of claim 1, further comprising:

identifying a third TTI that has a shorter duration than the second TTI;

mapping a second TB within the third TTI according to a non-wideband configuration that comprises resources of the first CC and excludes resources of the second CC; and using the second TB to communicate during the third TTI on the resources of the first CC.

6. The method of claim 5, further comprising:

determining that the second CC comprises at least one of a control region, a multicast-broadcast single frequency network (MBSFN) region, a guard period, an uplink subframe, or a cell-specific reference signal (CRS), or any combination thereof, during the third TTI, wherein mapping the second TB is based at least in part on the determination.

7. The method of claim 1, wherein the first CC and the second CC use different resource allocation methods or different modulation orders, or both.

8. The method of claim 1, wherein the resources of the first CC or the resources of the second CC, or both, comprise guard band resources.

9. The method of claim 1, further comprising:

performing a first channel estimation for the first CC and a second channel estimation for the second CC, wherein the TB is communicated based at least in part on the first channel estimation and the second channel estimation.

10. The method of claim 9, wherein the first CC has a first cell-specific reference signal (CRS) port configuration and the second CC has a second CRS port configuration, and wherein the first channel estimation is based at least in part on the first CRS port configuration and the second channel estimation is based at least in part on the second CRS port configuration.

11. The method of claim 1, wherein the first CC and the second CC comprise a same number of demodulation reference signal (DMRS) ports.

12. The method of claim 1, wherein the first TTI and the second TTI comprise different precoding resource block (RB) group (PRG) configurations.

13. The method of claim 1, further comprising:

performing a first rate matching procedure for the first CC and a second rate matching procedure for the second CC, wherein the TB is communicated based at least in part on the first rate matching procedure and the second rate matching procedure.

14. The method of claim 1, wherein a resource allocation scheme for the TB is based at least in part on a number of component carriers (CCs) used for mapping the TB.

15. The method of claim 14, wherein the resource allocation scheme comprises a frequency diversity scheme or a frequency selectivity scheme.

16. The method of claim 1, wherein a RB indexing configuration is based at least in part on a bandwidth of the first CC and the second CC.

17. The method of claim 1, wherein the first TTI comprises two or more symbols, and wherein the mapping for the TB comprises a frequency-first mapping scheme.

18. The method of claim 1, wherein a code block scheme for the TB is based at least in part on combined resources from the first CC and the second CC.

19. The method of claim 1, wherein a first portion of the TB is mapped to the resources of the first CC using a first code block scheme and a second portion of the TB is mapped to the resources of the second CC using a second code block scheme.

20. The method of claim 1, wherein a first modulation and coding scheme (MCS) is used for the first CC and a second MCS is used for the second CC.

21. The method of claim 1, further comprising:

identifying a same channel state information (CSI) report for the first CC and the second CC.

22. The method of claim 1, wherein the first CC has a first CSI reference signal (CSI-RS) port configuration and the second CC has a second CSI-RS configuration.

23. The method of claim 1, wherein a quasi-co-location (QCL) indication is configured for the first CC and the second CC.

24. The method of claim 1, wherein the resources of the first CC comprise a first uplink shared channel (UL-SCH) cluster and the resources of the second CC comprise a second UL-SCH cluster.

25. The method of claim 1, further comprising:

performing a joint discrete Fourier transform (DFT) operation on the TB over the first CC and the second CC.

26. The method of claim 1, further comprising:

communicating using an sounding reference signal (SRS) in a guard band of the first CC or the second CC, or both.

27. An apparatus for wireless communication using a carrier aggregation (CA) configuration having a first component carrier (CC) and a second CC comprising:

means for identifying a first transmission time interval (TTI) and a second TTI, wherein the second TTI has a longer duration than the first TTI;

means for identifying a control channel transmission on the first CC that assigns the resources of both of the first CC and the resources of the second CC;

means for mapping a transport block (TB) within the first TTI according to a wideband configuration that comprises the resources of the first CC and resources of the second CC; and means for using the TB to communicate during the first TTI on the resources of the first CC and the resources of the second CC.

28. An apparatus for wireless communication using a carrier aggregation (CA) configuration having a first component carrier (CC) and a second CC, comprising:

a processor;

memory in electronic communication with the processor; and instructions stored in the memory and operable, when executed by the processor, to cause the apparatus to:
- identify a first transmission time interval (TTI) and a second TTI, wherein the second TTI has a longer duration than the first TTI;
- identify a control channel transmission on the first CC that assigns the resources of both of the first CC and the resources of the second CC;
- map a transport block (TB) within the first TTI according to a wideband configuration that comprises the resources of the first CC and resources of the second CC; and
- use the TB to communicate during the first TTI on the resources of the first CC and the resources of the second CC.

29. A non-transitory computer-readable medium storing code for wireless communication using a carrier aggregation (CA) configuration having a first component carrier (CC) and a second CC, the code comprising instructions executable by a processor to:
- identify a first transmission time interval (TTI) and a second TTI, wherein the second TTI has a longer duration than the first TTI;
- identify a control channel transmission on the first CC that assigns the resources of both of the first CC and the resources of the second CC;
- map a transport block (TB) within the first TTI according to a wideband configuration that comprises the resources of the first CC and resources of the second CC; and
- use the TB to communicate during the first TTI on the resources of the first CC and the resources of the second CC.

* * * * *